United States Patent
Shim et al.

(10) Patent No.: US 10,241,613 B2
(45) Date of Patent: Mar. 26, 2019

(54) MOBILE TERMINAL AND METHOD FOR CONTROLLING THE SAME

(71) Applicant: LG ELECTRONICS INC., Seoul (KR)

(72) Inventors: Hongjo Shim, Seoul (KR); Hyunok Lee, Seoul (KR); Youngho Sohn, Seoul (KR); Mihyun Park, Seoul (KR); Jisoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 15/427,719

(22) Filed: Feb. 8, 2017

(65) Prior Publication Data
US 2017/0322665 A1  Nov. 9, 2017

(30) Foreign Application Priority Data
May 9, 2016  (KR) .................. 10-2016-0056537

(51) Int. Cl.
*G06F 3/041* (2006.01)
*G06F 3/0354* (2013.01)
(Continued)

(52) U.S. Cl.
CPC .......... *G06F 3/0416* (2013.01); *G06F 3/0386* (2013.01); *G06F 3/03542* (2013.01);
(Continued)

(58) Field of Classification Search
CPC .... G06F 3/0416; G06F 3/0425; G06F 3/0414; G06F 3/03542; G06F 3/03545;
(Continued)

(56) References Cited

U.S. PATENT DOCUMENTS 9,910,514 B2 *  3/2018  Mihal ................ G06F 3/03545
2004/0174698 A1 *  9/2004  Nagashima ........ G06F 3/03545
362/118

(Continued)

FOREIGN PATENT DOCUMENTS

WO    WO 02/48853 A1    6/2002

OTHER PUBLICATIONS

Hoffman, "Not All Tablet Styluses Are Equal: Capacitive, Wacom, and Bluetooth Explained," XP-055397278, https://www.howtogeek.com/177376/not-all-tablet-styluses-are-equal-capacitive-wacom-and-bluetooth-explained/, Dec. 18, 2013, 4 pages.

*Primary Examiner* — Jose Soto Lopez
(74) *Attorney, Agent, or Firm* — Birch, Stewart, Kolasch & Birch, LLP

(57) ABSTRACT

A mobile terminal including a touch screen; a stylus pen including a pressure sensor and an optical sensor; a wireless communication unit configured to wirelessly communicate with the stylus pen; and a controller configured to drive the stylus pen in a first operation mode in which the pressure sensor provided in the stylus pen is activated and the optical sensor is deactivated, when sensing information sensed by the pressure sensor indicates the stylus pen is in contact with the touch screen, and drive the stylus pen in a second operation mode in which both the pressure sensor and the optical sensor provided in the stylus pen are activated, when the sensing information sensed by the pressure sensor indicates the stylus pen is not in contact with the touch screen.

20 Claims, 21 Drawing Sheets

(51) Int. Cl.
  *G06F 3/038* (2013.01)
  *G06F 3/042* (2006.01)
  *H04B 1/3827* (2015.01)

(52) U.S. Cl.
  CPC ........ *G06F 3/03545* (2013.01); *G06F 3/0414* (2013.01); *G06F 3/0425* (2013.01); *G06F 2203/0384* (2013.01); *G06F 2203/04105* (2013.01); *G06F 2203/04106* (2013.01); *H04B 1/3827* (2013.01)

(58) Field of Classification Search
  CPC ......... G06F 3/0386; G06F 2203/04105; G06F 2203/0384; G06F 2203/04106; H04B 1/3827
  See application file for complete search history.

(56) References Cited

U.S. PATENT DOCUMENTS

| | | | | |
|---|---|---|---|---|
| 2005/0110777 A1* | 5/2005 | Geaghan | G06F 3/03542 | 345/179 |
| 2009/0027343 A1* | 1/2009 | Cho | G06F 3/0317 | 345/166 |
| 2010/0014784 A1* | 1/2010 | Silverbrook | G06K 9/228 | 382/313 |
| 2010/0207910 A1* | 8/2010 | Liu | G06F 3/0416 | 345/175 |
| 2011/0006982 A1* | 1/2011 | Rhee | G06F 3/03545 | 345/157 |
| 2011/0304577 A1* | 12/2011 | Brown | G06F 3/03545 | 345/174 |
| 2012/0127110 A1* | 5/2012 | Amm | G06F 3/03545 | 345/174 |
| 2012/0235934 A1* | 9/2012 | Kawasaki | G06F 3/03545 | 345/173 |
| 2013/0207937 A1* | 8/2013 | Lutian | G06F 3/042 | 345/175 |
| 2013/0278537 A1* | 10/2013 | Hansen | G06F 3/041 | 345/174 |
| 2013/0321351 A1* | 12/2013 | Paul | G06F 3/0317 | 345/179 |
| 2014/0184507 A1* | 7/2014 | Yamada | G06F 3/03545 | 345/158 |
| 2014/0354605 A1* | 12/2014 | Kurita | G06F 3/03545 | 345/179 |
| 2015/0100875 A1* | 4/2015 | Kim | G06F 17/242 | 715/232 |
| 2015/0169084 A1* | 6/2015 | Kang | G02B 26/026 | 345/175 |
| 2015/0169950 A1* | 6/2015 | Keysers | G06K 9/00422 | 382/187 |
| 2015/0347001 A1* | 12/2015 | Motoi | G06K 9/222 | 345/173 |
| 2016/0018910 A1* | 1/2016 | Walloth | G06K 9/222 | 345/179 |
| 2016/0162121 A1* | 6/2016 | Ono | G06T 7/593 | 345/175 |
| 2016/0239107 A1* | 8/2016 | Yeh | G06F 3/0383 | |
| 2017/0024028 A1* | 1/2017 | Valentine | G06F 3/03545 | |
| 2017/0090712 A1* | 3/2017 | Qian | G06F 3/04845 | |
| 2017/0185172 A1* | 6/2017 | Kitagawa et al. | G06F 3/03545 | |
| 2017/0277285 A1* | 9/2017 | Chung | G06F 3/03545 | |
| 2017/0315631 A1* | 11/2017 | Pourbigharaz | G06F 3/03545 | |
| 2017/0364208 A1* | 12/2017 | King-Smith | G06F 3/03545 | |
| 2018/0011550 A1* | 1/2018 | Mihal | G06F 3/03545 | |

* cited by examiner (a)

(b)

(a)

(b)

(a)

(b)

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2016-0056537, filed on May 9, 2016, the contents of which is incorporated by reference herein in its entirety.

BACKGROUND OF THE INVENTION

1. Field of the Invention

The present disclosure relates to a stylus pen and a mobile terminal communicating with the same.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal.

The functionality of the mobile terminal has been diversified. For example, there are functions of data and voice communication, photo capture and video capture through a camera, voice recording, music file reproduction through a speaker system, and displaying an image or video on the display unit. Some terminals may additionally perform an electronic game play function or perform a multimedia play function. In particular, recent terminals may receive multicast signals for providing video contents such as broadcasts, videos, television programs, or the like.

As it becomes multifunctional, for example, such a terminal can capture still images or moving images, play music or video files, play games, receive broadcast and the like, so as to be implemented as an integrated multimedia player. Meanwhile, such a terminal may be linked with a stylus pen that is mutually communicable through wireless communication, thereby further enhancing the convenience of a user input to the terminal.

For such a stylus pen, there exists a method of applying a direct input to a touch screen provided on the terminal or a method of applying an input such as a mouse used for a PC from an outside of the terminal. However, stylus pens in the related art may provide only any one of various input methods, thereby allowing a user to apply an input only to a touch screen provided on the terminal or apply an input only to a region out of the terminal according to the specification provided by the terminal and the type of the stylus pen used.

SUMMARY OF THE INVENTION

An object of the present disclosure is to provide a stylus pen capable of providing a plurality of input schemes and a mobile terminal capable of providing various functions in connection with a stylus pen capable of providing such a plurality of input schemes.

Another object of the present disclosure is to provide a mobile terminal capable of performing a different control operation according to a current input scheme of the stylus pen, thereby performing an optimized control operation according to the current input scheme.

Still another object of the present disclosure is to extend an input region up to a region out of the terminal, thereby providing a larger user input space.

To achieve these and other advantages and in accordance with the purpose of the present invention, as embodied and broadly described herein, the present invention provides in one aspect a mobile terminal provided with a touch screen and a stylus pen formed to have a plurality of sensors, a wireless communication unit configured to communicate with the stylus pen in a wireless manner, and a controller configured to determine whether or not a touch event has occurred on the touch screen in response to the reception of first sensing information sensed on a pressure sensor among the plurality of sensors provided in the stylus pen, wherein the controller drives an operation mode of the stylus pen according to whether or not the touch event has occurred in either one of a first operation mode in which the stylus pen applies an input to a region within a touch screen region of the touch screen, and a second operation mode in which the stylus pen applies an input to a region out of the touch screen region of the touch screen.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another. When an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context. Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, the configuration according to the exemplary embodiments of this specification can also be applied to stationary terminals such as a digital TV, a desktop computer, a digital signage and the like, excluding a case of being applicable only to the mobile terminals.

Figure 1A:
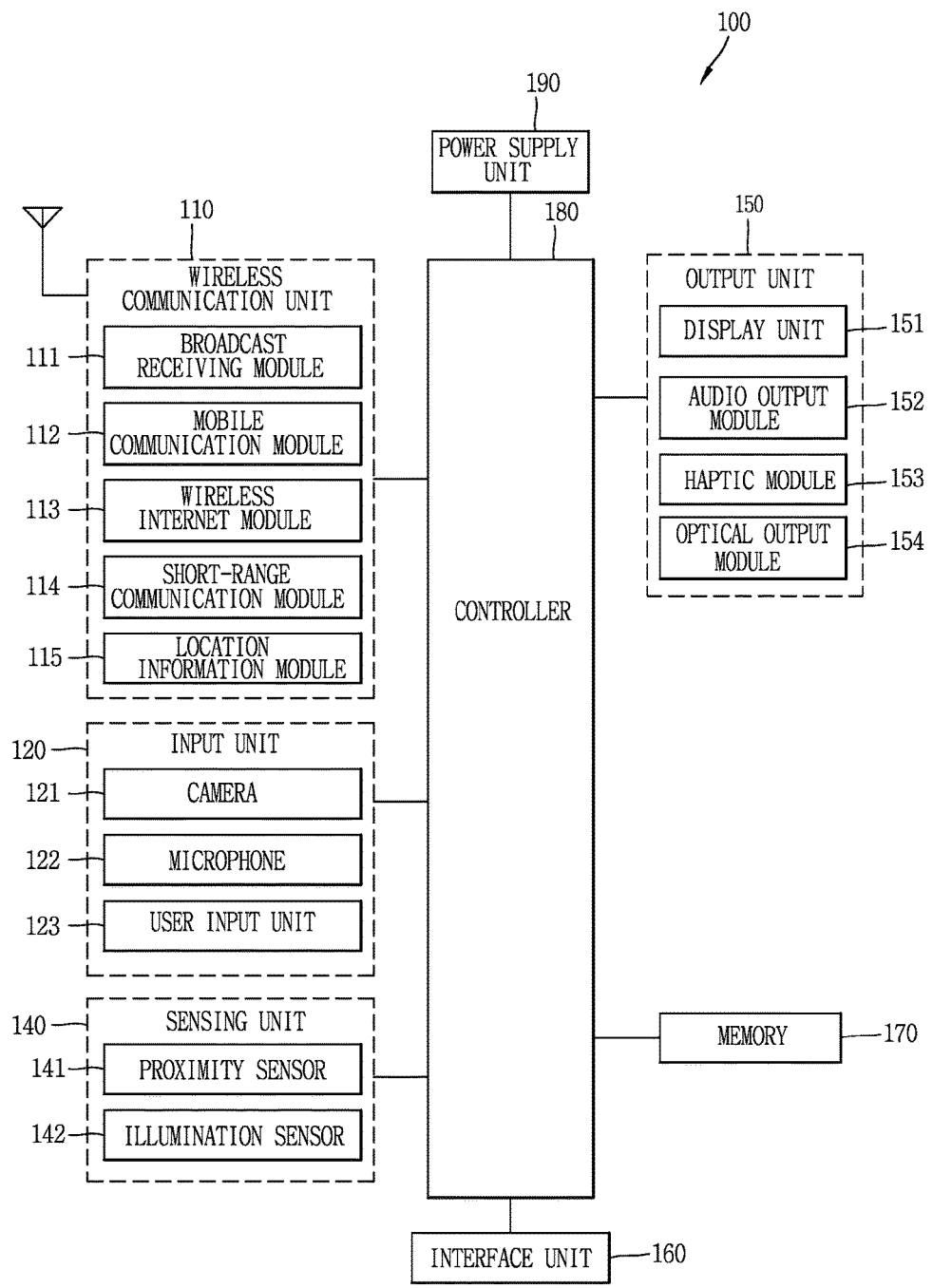
FIG. 1A is a block diagram illustrating a mobile terminal according to an embodiment of the present disclosure.
Figure 1B:
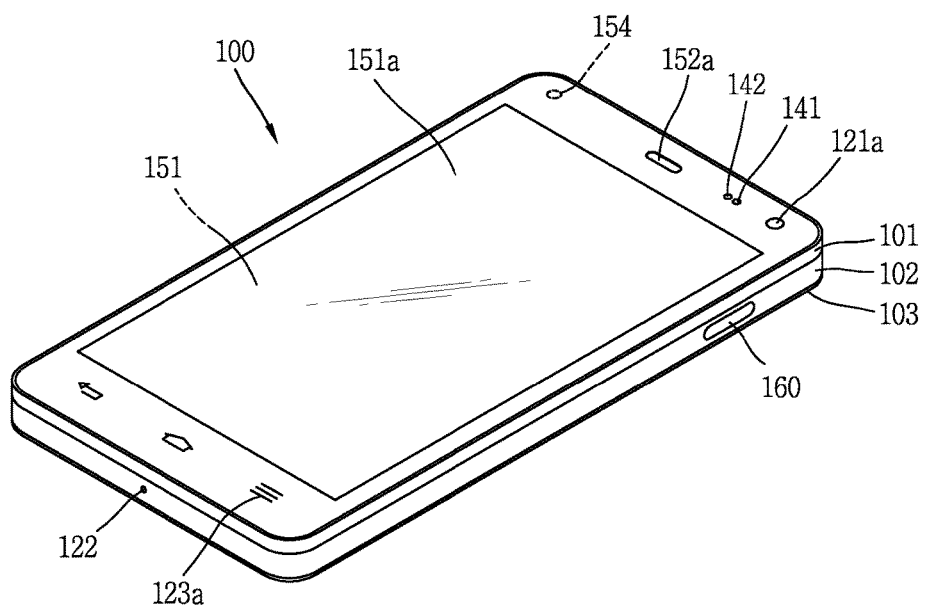
FIGS. 1B and 1C are conceptual views in which an example of a mobile terminal according to an embodiment of the present disclosure is seen from different directions.
Figure 1C:
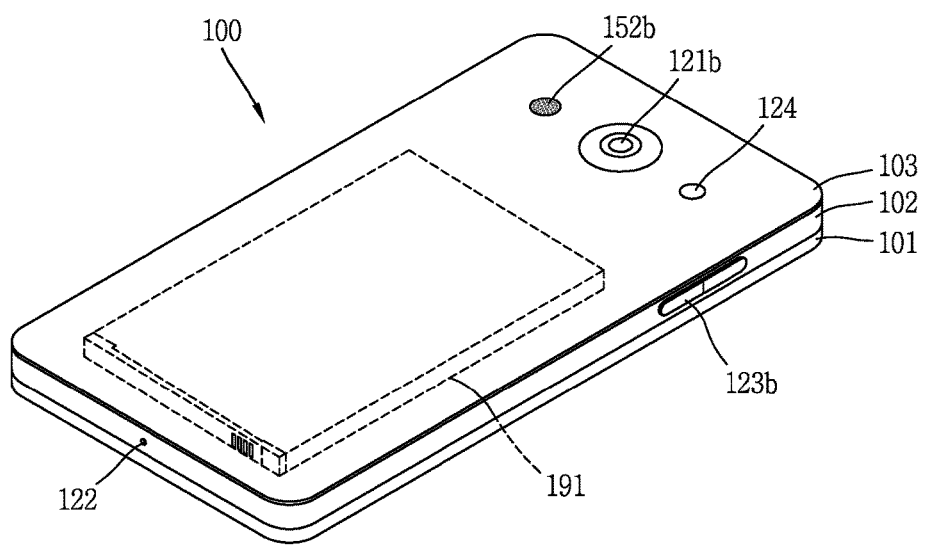

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 can include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located. For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 can execute an appropriate control associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1A, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.)

The wireless signals may include audio call signal, video (telephony) call signal, or various formats of data according to transmission/reception of text/multimedia messages. The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 can be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal), near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 can include one or a plurality of cameras 121. The camera 121 may process image frames of still pictures or video obtained by image sensors in a video call mode or a capture mode. The processed image frames may be displayed on the display unit 151. Further, the plurality of cameras 121 disposed in the mobile terminal 100 can be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user can feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 can include a message reception, a call signal reception, a missed call, an alarm, a schedule notice, an email reception, an information reception through an application, and the like.

A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 can be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Further, various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

The mobile terminal 100 can include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like. Unlike the example which the plurality of cases form an inner space for accommodating such various components, the mobile terminal 100 can be configured such that one case forms the inner space. In this example, a mobile terminal 100 having a uni-body formed so synthetic resin or metal extends from a side surface to a rear surface may also be implemented.

Further, the mobile terminal 100 can include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display on a rear surface of the window 151a or patterned directly on the rear surface of the window 151a. Or, the touch sensor may be integrally formed with the display. For example, the touch sensor may be disposed on a substrate of the display or within the display. The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds. The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 can include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170. The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 can include a finger scan sensor which scans a user's fingerprint. The controller may use fingerprint information sensed by the finger scan sensor as an authentication means. The finger scan sensor may be installed in the display unit 151 or the user input unit 123. The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121*b* is implemented as the array camera, images may be captured in various manners using the plurality of lenses and images with better qualities may be obtained.

A flash 124 may be disposed adjacent to the second camera 121*b*. When an image of a subject is captured with the camera 121*b*, the flash 124 may illuminate the subject. The second audio output module 152*b* may further be disposed on the terminal body. The second audio output module 152*b* may implement stereophonic sound functions in conjunction with the first audio output module 152*a* (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 can be disposed on the terminal body. The power supply unit 190 may include a batter 191 which is mounted in the terminal body or detachably coupled to an outside of the terminal body. The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 can further be provided on the mobile terminal 100. As one example of the accessory, a cover or pouch for covering or accommodating at least one surface of the mobile terminal 100 can be provided. The cover or pouch may cooperate with the display unit 151 to extend the function of the mobile terminal 100. Another example of the accessory may be a touch pen for assisting or extending a touch input onto a touch screen.

As described above, a mobile terminal 100 according to an embodiment of the present disclosure can process information, a control command entered through a touch pen or stylus pen in connection with the touch pen or stylus pen. Hereinafter, the touch pen or stylus pen may be commonly referred to as a "stylus pen."

The mobile terminal 100 according to an embodiment of the present disclosure can communicate with a stylus pen through wireless communication to receive information input through the stylus pen, and perform control corresponding to the received information. One or more methods may be used for a method of performing communication between the mobile terminal 100 and the stylus pen in a wireless manner. For example, the mobile terminal 100 and the stylus pen may perform communication using at least one of technologies including BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. A communication method between the mobile terminal 100 and the stylus pen may vary according to an operation mode of the stylus pen. Meanwhile, in the following description, it will be described on the assumption that the mobile terminal 100 and the stylus pen are paired with each other to enable data communication.

Moreover, the type of a stylus pen according to an embodiment of the present disclosure may be classified according to which method the mobile terminal senses a touch due to the stylus pen or which method the stylus pen applies a touch to the mobile terminal. For example, a stylus pen according to an embodiment of the present disclosure may be any one of a passive capacity pen, an EMR pen, an active capacity pen, and an ultrasonic pen, and may be also another type of stylus pen. Furthermore, a mobile terminal according to an embodiment of the present disclosure may have a appropriate structure for sensing a touch due to the stylus pen according to the type of the stylus pen.

A stylus pen communicating with a mobile terminal according to an embodiment of the present disclosure may have a plurality of operation modes, and may be driven in any one of the plurality of operation modes according to a relative positional relationship between the mobile terminal and the stylus pen.

Figure 2:
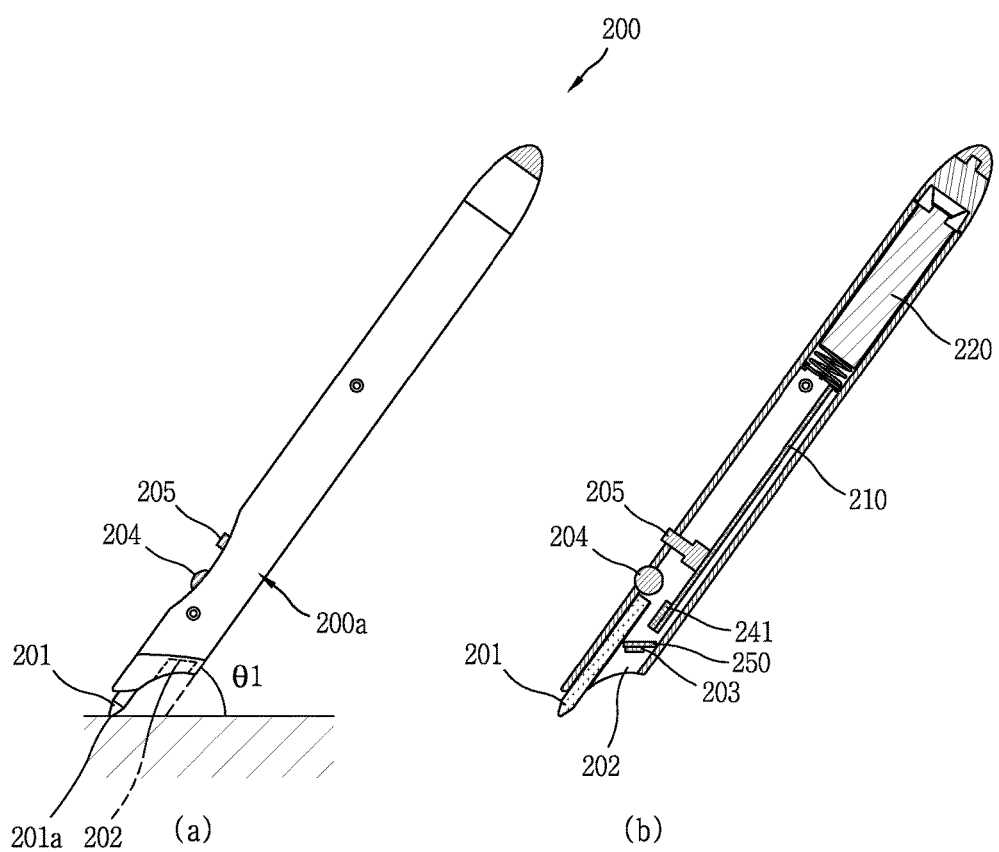
FIG. 2 is conceptual views illustrating a stylus pen according to the present disclosure.

A stylus pen according to an embodiment of the present disclosure having a plurality of operation modes is caused by sensors provided in the stylus pen. Hereinafter, the stylus pen communicating with a mobile terminal according to an embodiment of the present disclosure will be described in more detail with reference to the accompanying drawings. FIG. 2 includes conceptual views illustrating a stylus pen according to the present disclosure, and in FIG. 2, an active capacity pen is particularly illustrated for an example among the foregoing various types of pens, but as described above, another type of stylus pen may be also applicable to the present disclosure.

As illustrated in the drawing, a stylus pen 200 according to an embodiment of the present disclosure includes a tip portion 201, an optical sensor 203, a sensing hole 202, a pressure sensor 241, a controller 210, and a battery 220. Additionally, the stylus pen 200 can include a scroll portion 204 and at least one button portion 205.

The tip portion 201 is disposed at one end portion of the stylus pen 200, and at least part thereof is formed to protrude from a frame 200*a* of the stylus pen 200. The tip portion 201 is formed to generate a touch signal (or electric field) due to a contact with the touch screen. The electric field may be formed between the tip portion 201 and the frame 200*a* of the stylus pen 200, and the tip portion 201 and at least part of the frame 200*a* may be formed of conductive material.

For example, the tip portion 201 may be formed to move by external pressurization. More specifically, when the tip portion 201 is brought into contact with the touch screen or an external object to apply a repulsive force, the tip portion 201 can slide toward an inside of the frame 200*a*. The movement of the tip portion 201 is sensed by the pressure sensor 241, and the pressure sensor 241 is configured to sense a pressure applied to the tip portion 201 using the movement extent (or movement distance, movement amount) of the tip portion 201. In this instance, the pressure sensor 241 may be mounted on a circuit substrate 210 provided in the stylus pen 200. The circuit substrate 210 is an example of the controller, and hereinafter, the controller will be referred to as reference numeral "210."

In addition, the pressure sensor 241 may include a light source and a detector. The detector detects an amount of light emitted from the light source interfering with the tip portion 201 to sense the movement extent of the tip portion 201. As a result, the movement extent of the tip portion 201 is converted into pressure information applied to the tip portion 201.

In another example, a piezoelectric sensor may be mounted on the tip portion 201. The piezoelectric sensor may be disposed to be pressurized by an end portion opposite to one end 201a of the tip portion 201. Accordingly, the stylus pen 200 can directly sense a pressure applied to the tip portion 201 using the piezoelectric sensor.

The optical sensor 203 may be disposed at an end portion on which the tip portion 201 is mounted. The sensing hole 202 may be formed on the end portion, an opening portion for communicating between an inside and an outside of the stylus pen 200 can be disposed thereon. Furthermore, a light transmitting member may be mounted on the sensing hole 202.

The optical sensor 203 is disposed to face the sensing hole 202, and formed to emit light to an object (for example, a touch screen or an external object other than the touch screen) facing the optical sensor 203. Light reflected from the object facing the optical sensor 203 is incident to the optical sensor 203 through the sensing hole 202, and the controller 210 of the stylus pen 200 can process the incident light as the input information of the stylus pen 200. In this instance, the optical sensor 203 may be mounted on an secondary circuit substrate 250 different from the circuit substrate 210. The secondary circuit substrate 250 may be disposed in a direction crossing the circuit substrate 210, and located to face the sensing hole 202. However, the present disclosure may not include the secondary circuit substrate 250, and the optical sensor 203 may be also mounted on the circuit substrate 210.

Moreover, the optical sensor 203 and the tip portion 201 may be disposed to form an obtuse angle to each other. When an angle (θ1) formed by the pen and the external object during writing is 70±5 degrees, the optical sensor 203 and the tip portion 201 are disposed at an angle of 180−θ1 rather than verticality. Thus, the tip portion 201 and the tip portion 201 form an obtuse angle to each other.

The scroll portion 204 may be formed with either one of an electronic or mechanical method (physical method). At least part of the scroll portion 204 may be mounted on the frame 200a to be exposed to an outside. The button portion 205 may be formed with a push button or touch button. According to the present example, a push button is illustrated, and the push button may be mounted on the frame 200a to expose at least part thereof.

The battery 220 is formed to be inserted into the frame 200a through the other end portion (a side opposite to an end portion disposed with the tip portion 201) of the stylus pen 200. Thus, a battery accommodation groove may be formed at the other end portion. The stylus pen 200 in an active manner as illustrated in the present example, may spontaneously form an electric field using power supplied from the stylus pen 200 provided in the stylus pen 200.

In addition, the stylus pen 200 according to an embodiment of the present disclosure is formed to include a wireless communication unit. The wireless communication unit communicates with the mobile terminal 100 in at least one of schemes including BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like, and thus configured to transmit information sensed or entered through the stylus pen 200 to the mobile terminal 100.

Figure 3:
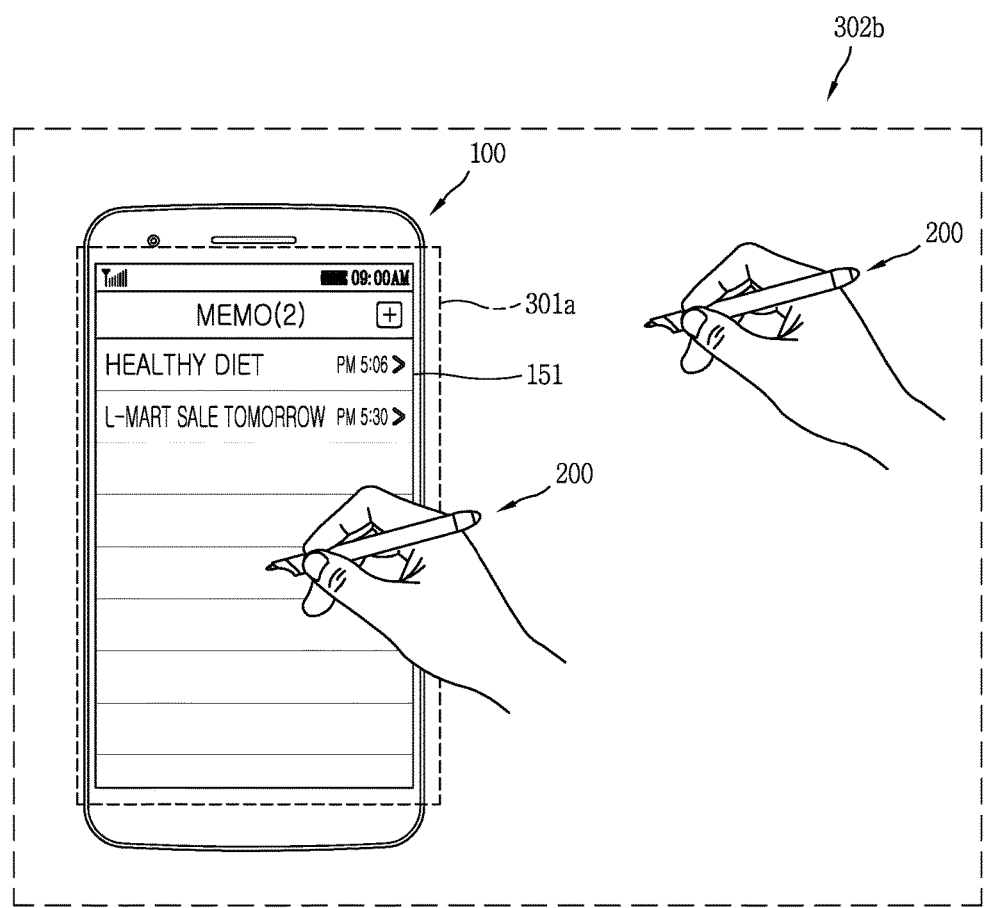
FIG. 3 is a conceptual view illustrating an operation of a stylus pen in the present disclosure.
Figure 4:
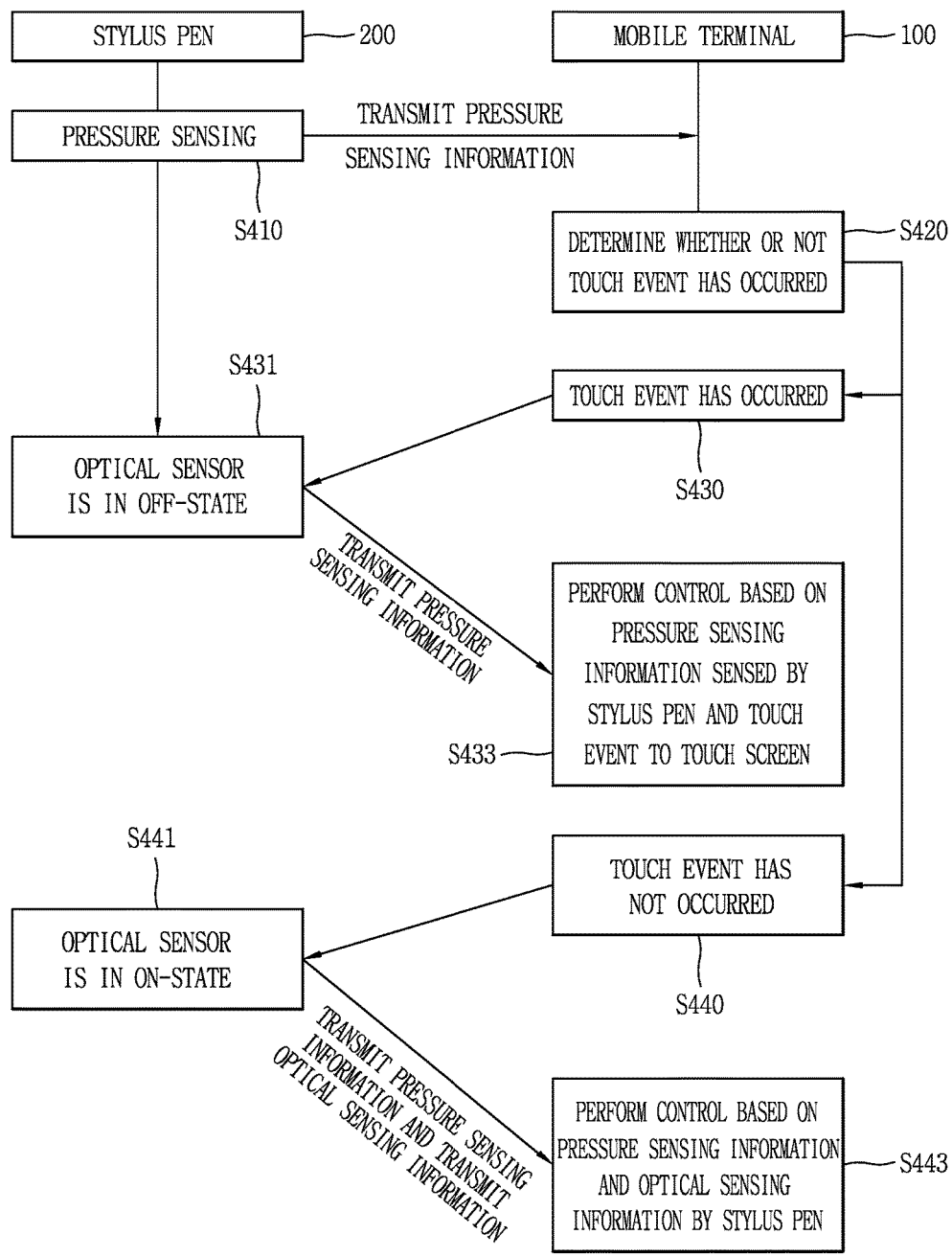
FIG. 4 is a conceptual view illustrating an operation method of a mobile terminal and a stylus pen according to the present disclosure.

Hereinafter, a method of performing various controls on the mobile terminal in connection with the mobile terminal according to an operation mode using the stylus pen having the foregoing structure will be described in more detail with reference to the accompanying drawings. FIG. 3 is a conceptual view illustrating an operation of a stylus pen in the present disclosure, FIG. 4 is a conceptual view illustrating an operation method of a mobile terminal and a stylus pen according to an embodiment of the present disclosure, and FIGS. 5A, 5B, 5C, 6, 7A and 7B are conceptual views illustrating specific examples for the operation method illustrated in FIG. 4.

As described above, the stylus pen 200 according to an embodiment of the present disclosure may include a pen tip 201 for applying a touch to the mobile terminal, a pressure sensor 241 for sensing a pressure applied to the pen tip 201, and an optical sensor 203 (refer to FIG. 2). The stylus pen 200 can be driven in a different operation mode according to an object body to which the stylus pen 200 applies an input, and the activated sensor may respectively vary in such a different operation mode. An object body to which the stylus pen 200 applies an input may be divided into a touch screen of the mobile terminal, and other objects excluding the touch screen.

As illustrated in FIG. 3, when an input is applied to the touch screen 151 of the mobile terminal 100 by the stylus pen 200, the stylus pen 200 can be operated in a first operation mode. For example, when the stylus pen is a pen in an active manner, the stylus pen 200 can form an electric field. In this instance, the mobile terminal 100 can sense a touch input of the pen tip 201 of the stylus pen 200 applied to the touch screen. Furthermore, the stylus pen 200 can transfer a touch signal to the mobile terminal based on the electric field formed from the stylus pen 200.

In this instance, the controller 180 can receive the touch signal to recognize that the stylus pen 200 has applied a touch to the touch screen 151. For an example, an electric field can be generated between the pen tip 201 of the stylus pen 200 and a frame (or case) of the stylus pen 200, and an electric field Tx signal can be produced based on the generated electric field. In this instance, the controller 180 of the stylus pen 200 can receive the Tx signal to sense the occurrence of a touch due to the stylus pen 200.

When an input is applied to a region out of the touch screen 151 of the mobile terminal 100 due to the stylus pen 200, the stylus pen 200 can be operated in a second operation mode different from the first operation mode. In the first and the second operation mode of the stylus pen 200, at least one of the activated sensors can be different.

For example, usable sensors for receiving a user input are the pressure sensor 241 and the optical sensor 203 are included. In this instance, in the first operation mode in which an input due to the stylus pen 200 is applied to the touch screen 151 of the mobile terminal 100, a direct touch input to the touch screen 151 by the stylus pen 200 activates only the pressure sensor 241 between the pressure sensor 241 and the optical sensor 203. Accordingly, the controller 180 can combine a touch input due to the pen tip 201 and pressure sensing information sensed by the pressure sensor 241 at the time when the touch input due to the pen tip 201 is applied to perform appropriate control.

In the second operation mode, a touch input to the touch screen 151 due to the stylus pen 200 is not performed, and the role of entering information to the touch screen 151 or mobile terminal 100 can be substituted with the use of the optical sensor 203. In other words, according to an embodiment of the present disclosure, it is possible to sense the touch trajectory or movement trajectory of the stylus pen 200 on an external object out of the touch screen using the optical sensor 203. The stylus pen 200 can sense light that has been emitted from the optical sensor arrives at an external object and then reflected again. Furthermore, the sensed information may be processed as the input information of the stylus pen 200. Accordingly, a mobile terminal according to an embodiment of the present disclosure can sense a user input through the stylus pen 200 even though the stylus pen 200 is located out of the touch screen 151 as illustrated in FIG. 3.

Further, in the first operation mode, the optical sensor 203 may be in an inactive state since the sensing of a user input through the stylus pen 200 is allowed through the touch screen 151. In other words, in the first and the second operation mode, at least one of activated sensors may be different from each other. Thus, a mobile terminal and a stylus pen according to an embodiment of the present disclosure can control an activated sensor according to a position to which the stylus pen 200 applies an input, and the stylus pen 200 can apply a user input to the mobile terminal 100 up to a region out of the touch screen 151 as well as the touch screen 151 of the mobile terminal.

As described above, a mobile terminal and a stylus pen according to an embodiment of the present disclosure can be operated in either one of the first and the second operation mode according to a position at which the stylus pen is located. Hereinafter, a method of determining the operation mode of the stylus pen and a method of controlling the operation mode will be described in more detail.

According to an embodiment of the present disclosure, it is possible to know the user's intention to use the stylus pen using a pressure sensor provided in the stylus pen 200. More specifically, when the pen tip 201 of the stylus pen 200 is pressurized, the pressure sensor 241 can sense the pressurization of the pen tip 201. When a pressure applied to the pen tip 201 is sensed by the pressure sensor 241, the controller 210 of the stylus pen 200 can perform appropriate control to control the operation mode of the stylus pen 200.

Accordingly, the controller 180 of the mobile terminal 100 that has received pressure sensing information from the controller 210 of the stylus pen 200 or the stylus pen 200 can control at least one sensor provided in the stylus pen 200 based on the pressure sensing information so the stylus pen 200 is in an operation state capable of receiving information according to a position at which the stylus pen 200 is located.

Further, the controller 180 of the mobile terminal 100 that has received pressure sensing information from the controller 210 of the stylus pen 200 or the stylus pen 200 can control the operation mode of the stylus pen 200 when the pressure sensing information corresponds to preset pressure pattern information.

Here, the preset pressure pattern information can be data associated with a pressurization pattern in which the pen tip 201 of the stylus pen 200 is pressurized. The controller 180 of the mobile terminal 100 that has received pressure sensing information from the controller 210 of the stylus pen 200 or the stylus pen 200 can control the operation mode of the stylus pen 200 only when the pen tip 201 is pressurized in a preset manner (for example, a preset number of times, a preset intensity, etc.). In other words, the controller 180 of the mobile terminal 100 that has received pressure sensing information from the controller 210 of the stylus pen 200 or the stylus pen 200 can recognize when a pressure applied to the pen tip 201 corresponds to a preset manner as a user's real intention desired to apply a user input through the stylus pen 200. Accordingly, when the stylus pen 200 is pressurized by a malfunction, the stylus pen 200 can be controlled not to receive a user input.

Further, the stylus pen 200 can be operated in any one of a first operation mode, a second operation mode and a sleep mode, and the sleep mode denotes a state in which a user input is not received. In the sleep mode, at least one of sensors provided in the stylus pen 200 can be deactivated. Meanwhile, even in the sleep mode, the pressure sensor 241 provided in the stylus pen 200 can exist in an active state either continuously or for a preset period of time, and through this, the stylus pen 200 can sense a pressure even in the sleep mode to know the user's intention desired to use the stylus pen 200.

Which one of sensors provided in the stylus pen 200 will be activated can be different according to the operation mode of the stylus pen, and hereinafter, the operation mode of the stylus pen will be described in detail. The operation mode of the stylus pen 200 excluding the sleep mode can be controlled in two modes.

For a first mode, the operation mode of the stylus pen 200 can be controlled by the controller 210 provided in stylus pen 200. More specifically, the controller 210 provided in the stylus pen 200 can determine whether the stylus pen 200 is located on the touch screen 151 of the mobile terminal 100 or located out of the touch screen 151 when pressure information is sensed by the pressure sensor. Furthermore, the operation mode of the stylus pen 200 can be determined based on a result of the determination.

For example, as a result of the determination, when the stylus pen 200 is located on the touch screen 151, the controller 210 of the stylus pen 200 can drive the pressure sensor 241 in an active state and the optical sensor 203 in an inactive state. In the first operation mode, the stylus pen 200 can enter information through a touch input to the touch screen, and thus the optical sensor 203 maintains an inactive state.

Further, the controller 210 of the stylus pen 200 can determine whether the stylus pen 200 is located on the touch screen 151 or located out of the touch screen 151 through any one of various methods. For example, the controller 210 of the stylus pen 200 can sense an amount of light through the optical sensor 203 in response to the sensing of a pressure applied to the pen tip 201 on the pressure sensor 241 of the stylus pen 200. When the amount of light sensed through the optical sensor 203 is above a preset reference, the controller 210 can determine that the stylus pen 200 is located on the touch screen 151. This is based on the assumption that the touch screen 151 is in an on state. In other words, when the touch screen 151 is in an on state, the optical sensor 203 of the stylus pen 200 located on the touch screen 151 can sense an amount of light above a preset reference based on the light emitted from the touch screen 151. Thus, when it is determined that the stylus pen 200 is located on the touch screen 151, the controller 210 can drive the optical sensor 203 in an off state to execute a touch input on the touch screen 151 using the pen tip 201 and the pressure sensor 241.

In another example, when the amount of light sensed through the optical sensor 203 is below (or less than) a preset reference, the controller 210 can determine that the stylus pen 200 is located out of the touch screen 151. This is based on the assumption that the touch screen 151 is in an on state. Further, the controller 210 drives the optical sensor 203 in an on state, and senses a user input applied to a region out of the touch screen 151 using the optical sensor 203 and the pressure sensor 241.

In still another example, whether the stylus pen 200 is located on the touch screen 151 or located out of the touch screen 151 can be determined based on the intensity of a wireless signal between the stylus pen 200 and the mobile terminal 100. The controller 210 of the stylus pen 200 can sense the intensity of a wireless signal between the mobile terminal 100 and the stylus pen 200 through the optical sensor 203 in response to the sensing of a pressure applied to the pen tip 201. When the sensed intensity of the wireless signal is above a preset level, the controller 210 of the stylus pen 200 can determine that the stylus pen 200 is on the touch screen 151 to operate the operation mode of the stylus pen 200 in a first operation mode. When the sensed intensity of the wireless signal is below (or less than) a preset level, the controller 210 of the stylus pen 200 can determine that the stylus pen 200 is located out of the touch screen 151 to operate the operation mode of the stylus pen 200 in a second operation mode.

As described above, after the operation mode of the stylus pen 200 is determined by the control of the stylus pen 200, the controller 180 of the mobile terminal 100 can receive information sensed from sensors activated in each operation mode of the stylus pen 200 to perform control corresponding to the received information. The controller 180 can perform different control actions according to information sensed in which mode even if it is the same user input. Various controls on the mobile terminal according to the operation mode will be described in more detail in the following description. Hereinafter, a method of controlling the operation mode of the stylus pen in a mobile terminal will be described.

In the above, a method of controlling the operation mode of the stylus pen 200 on the stylus pen 200 itself has been described. Meanwhile, a mobile terminal according to an embodiment of the present disclosure can control the operation mode of the stylus pen 200 based on pressure sensing information received from the stylus pen 200. The controller 180 of the mobile terminal 100 can determine whether or not a touch due to the stylus pen 200 has been sensed on the touch screen 151, and determine the operation mode of the stylus pen 200 according to a result of the determination. Furthermore, the controller 180 can transmit a control signal corresponding to the determined operation mode to the stylus pen 200. Then, the stylus pen 200 can activate or deactivate a sensor required to operate an operation mode determined by the mobile terminal 100 based on the control signal.

Hereinafter, a method of controlling the operation mode of the stylus pen 200 on a mobile terminal will be described in more detail. First, it is based on the assumption that the operation mode of the stylus pen 200 is a sleep mode. As illustrated in FIG. 4, the process of sensing a pressure applied to the pen tip 201 on the pressure sensor 241 provided in the stylus pen 200 in a sleep mode is performed (S410).

The controller 210 of the stylus pen 200 transmits pressure sensing information (hereinafter, referred to as first sensing information) sensed on the pressure sensor 241 to the mobile terminal 100 through wireless communication in response to the sensing of a pressure applied to the pen tip 201 from the pressure sensor 241. The process (S420) of determining whether or not a touch event has occurred on the touch screen 151 in response to the reception of the first sensing information is performed on the mobile terminal.

The process of determining whether or not the touch event has occurred may additionally perform the process of acquiring touch coordinate information corresponding to the touch event.

Further, the stylus pen 200 can transmit the first sensing information to the mobile terminal 100 only when the first sensing information corresponds to preset pressure pattern information. In another example, the controller 180 of the mobile terminal 100 can determine whether or not the touch event has occurred on the touch screen only when the first sensing information corresponds to preset pressure pattern information.

In other words, the controller 180 of the mobile terminal 100 that has received pressure sensing information from the controller 210 of the stylus pen 200 or the stylus pen 200 can control the operation mode of the stylus pen 200 when the pressure sensing information corresponds to preset pressure pattern information. Here, preset pressure pattern information may be data associated with a pressurization pattern in which the pen tip 201 of the stylus pen 200 is pressurized.

The controller 180 of the mobile terminal 100 that has received pressure sensing information from the controller 210 of the stylus pen 200 or the stylus pen 200 can control the operation mode of the stylus pen 200 only when the pen tip 201 is pressurized in a preset manner (for example, a preset number of times, a preset intensity, etc.). In other words, the controller 180 of the mobile terminal 100 that has received pressure sensing information from the controller 210 of the stylus pen 200 or the stylus pen 200 can recognize when a pressure applied to the pen tip 201 corresponds to a preset manner as a user's real intention desired to apply a user input through the stylus pen 200. Accordingly, when the stylus pen 200 is pressurized by a malfunction, the pen 200 can be controlled not to be in a state capable of receiving a user input.

At the process S420, the controller 180 senses whether or not a touch event due to the stylus pen 200 has occurred on the touch screen 151. Here, the touch event is an event associated with whether or not the touch screen 151 is touched by the stylus pen 200 at the time when the first sensing information is sensed on the stylus pen 200, and the touch event may be sensed on a touch sensor (or touch panel) provided in the touch screen 151.

In other words, when an object body to which pressurization is applied at the time when pressurization is applied to the pen tip 201 is the touch screen 151, the touch event can occur. Further, a touch event to the touch screen 151 may be sensed in various manners. For an example, the touch screen 151 may sense a touch input applied to the touch screen 151 by the pen tip 201 of the stylus pen 200 formed as a conductor. Furthermore, the stylus pen 200 can transfer a touch signal to a side of the mobile terminal based on an electric field formed on the stylus pen 200. In this instance, the touch screen 151 or the controller 180 of the mobile terminal may sense such a touch signal to recognize that the stylus pen 200 has applied a touch to the touch screen 151.

Further, the controller 180 can drive an operation mode of the stylus pen according to whether or not the touch event has occurred in either one of a first operation mode in which the stylus pen applies an input to a region within a touch screen region of the touch screen, and a second operation mode in which the stylus pen applies an input to a region out of the touch screen region of the touch screen. The controller 180 can transmit a control signal for controlling the operation mode of the stylus pen 200 to the stylus pen 200. The stylus pen 200 can be operated in either one operation mode based on such a control signal.

When it is determined that a touch event has occurred during the process S420, namely, when the touch event has occurred as a result of determination in response to the reception of the first information (S430), the controller 180 can drive the stylus pen in the first operation mode.

The first operation mode of the stylus pen may be a state in which the pressure sensor provided in the stylus pen is activated, and the optical sensor is deactivated. For example, it is assumed that usable sensors for receiving a user input are the pressure sensor 241 and the optical sensor 203. In this instance, in the first operation mode in which an input due to the stylus pen 200 is applied to the touch screen 151 of the mobile terminal 100, a direct touch input to the touch screen 151 by the stylus pen 200 can be allowed to activate only the pressure sensor 241 between the pressure sensor 241 and the optical sensor 203. When the optical sensor 203 is in an on state, it is switched to an off state, or when the optical sensor 203 is in an off state, it continuously maintains the off state (S431).

Accordingly, the stylus pen 200 transmits pressure sensing information sensed from the pressure sensor 241 to the mobile terminal 100 (S432). Accordingly, the controller 180 of the mobile terminal can combine a touch input due to the pen tip 201 and pressure sensing information (pressure sensing information received from the stylus pen during the process S432) sensed by the pressure sensor 241 at the time when the touch input due to the pen tip 201 is applied to perform control for the mobile terminal (S433).

Figure 5A:
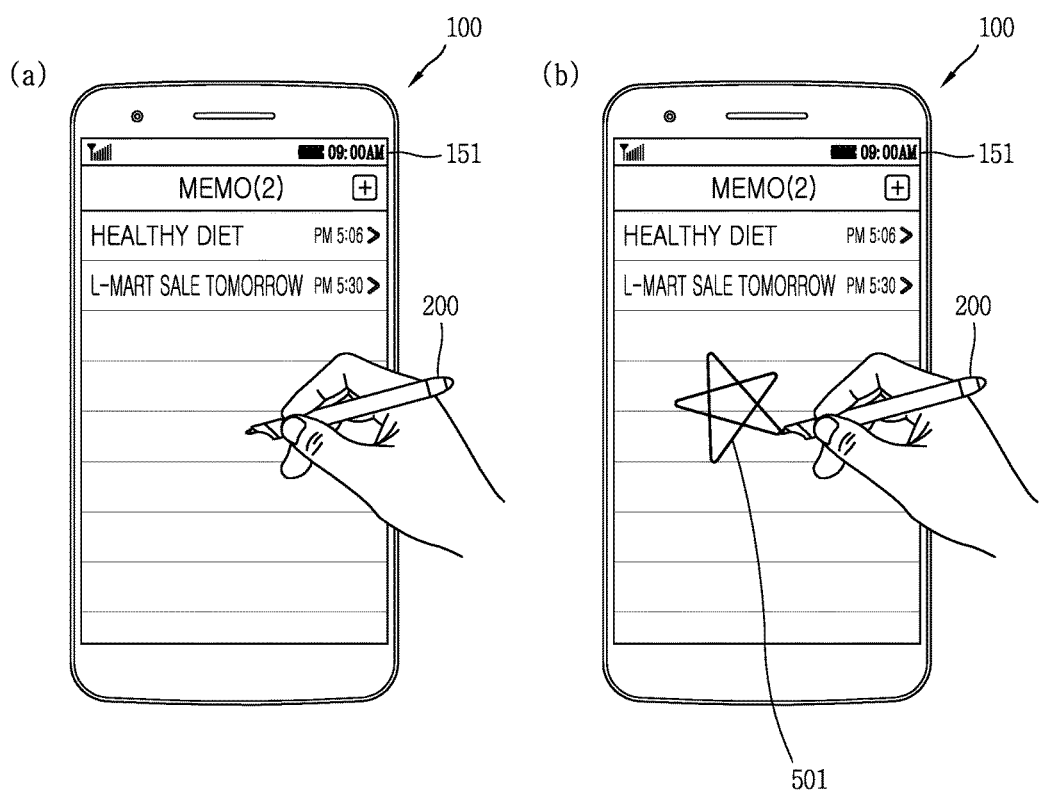
FIGS. 5A, 5B, 5C, 6, 7A and 7B are conceptual views illustrating specific examples for the operation method illustrated in FIG. 4.

For example, as illustrated in FIG. 5A, when a touch input is applied to stylus pen 200 on the touch screen 151 in the first operation mode, the controller 180 can display information 501 corresponding to the touch input. The controller 180 can process information entered by the stylus pen 200 in association with an application corresponding to an execution screen currently displayed on the touch screen 151. For example, as illustrated in the drawing, when information 501 is entered by the stylus pen 200 when a memo application is displayed, the entered information may be processed as memo information. Furthermore, the entered information may be processed as an input for selecting a function associated with the memo application or controlling the memo application.

Further, the controller 180 can process information entered by the stylus pen 200 in a different manner according to pressure information sensed at the time when an input due to the stylus pen 200 is applied. For example, when pressure information sensed at the time when an input due to the stylus pen 200 is applied corresponds to a first reference pressure, the controller 180 can process an input due the stylus pen 200 in association with an application corresponding to an execution screen currently displayed on the touch screen 151.

In addition, when pressure information sensed at the time when an input due to the stylus pen 200 is applied corresponds to a second reference pressure different from the first reference pressure, the controller 180 can process an input due the stylus pen 200 in association with a function or application different from or an application corresponding to an execution screen currently displayed on the touch screen 151.

For example, the controller 180 can control a different application driven in the background based on an input due to the stylus pen 200. In addition, when an input corresponding to the second reference pressure is sensed, a mobile terminal according to an embodiment of the present disclosure can display a list or icon including items corresponding to different applications or different functions, respectively, that are subject to control, thereby providing a user interface capable of selecting a control object function or application.

Further, as a result of the determination during the process S420, when it is determined that a touch event has not occurred (S420), the controller 180 can generate an appropriate control signal to drive the stylus pen 200 in the second operation mode. The controller 180 can transfer a control signal for allowing both the pressure sensor and the optical sensor provided in the stylus pen to be activated to the stylus pen 200 in the second operation mode of the stylus pen.

In other words, when the optical sensor 203 of the stylus pen 200 is in an off state, the process (S441) of switching the optical sensor 203 to an on state is performed in the stylus pen 200. In the second operation mode, a touch input to the touch screen 151 due to the stylus pen 200 is not allowed, and the role of entering information to the touch screen 151 or mobile terminal 100 can be substituted with the use of the optical sensor 203. In other words, according to the present disclosure, it is possible to sense the touch trajectory or movement trajectory of the stylus pen 200 on an external object out of the touch screen using the optical sensor 203.

Furthermore, the process (S442) of transmitting information (for example, at least one of pressure sensing information or optical sensing information) sensed in the second operation mode of the stylus pen 200 to the mobile terminal 100 is performed. Based on the received information, the process of controlling the mobile terminal based on pressure sensing information or optical sensing information sensed by the stylus pen 200 is performed in the mobile terminal 100 (S443). Thus, according to an embodiment of the present disclosure, even when there is no touch input to the touch screen 151, the control of the mobile terminal 100 can be allowed based on information sensed by the stylus pen 200 out of the touch screen 151. Thus, in a mobile terminal according to an embodiment of the present disclosure, at least one of activated sensors is different in the first and the second operation mode of the stylus pen 200. Thus, a mobile terminal and a stylus pen according to an embodiment of the present disclosure can control an activated sensor according to a position to which the stylus pen 200 applies an input, and the stylus pen 200 can apply a user input to the mobile terminal 100 up to a region out of the touch screen 151 as well as the touch screen 151 of the mobile terminal.

As described above, a mobile terminal and a stylus pen according to an embodiment of the present disclosure can be operated in either one of the first and the second operation mode according to a position at which the stylus pen is located. Hereinafter, a method of determining the operation mode of the stylus pen and a method of controlling the operation mode will be described in more detail.

According to an embodiment of the present disclosure, it is possible to know the user's intention desired to use the stylus pen using a pressure sensor provided in the stylus pen 200. More specifically, when the pen tip 201 of the stylus pen 200 is pressurized, the pressure sensor 241 can sense the pressurization of the pen tip 201. When a pressure applied to the pen tip 201 is sensed by the pressure sensor 241, the controller 210 of the stylus pen 200 can perform appropriate control to control the operation mode of the stylus pen 200.

Accordingly, the controller 180 of the mobile terminal 100 that has received pressure sensing information from the controller 210 of the stylus pen 200 or the stylus pen 200 can control at least one sensor provided in the stylus pen 200 based on the pressure sensing information so the stylus pen 200 is in an operation state capable of receiving information according to a position at which the stylus pen 200 is located. Further, the controller 180 of the mobile terminal 100 that has received pressure sensing information from the controller 210 of the stylus pen 200 or the stylus pen 200 can control the operation mode of the stylus pen 200 when the pressure sensing information corresponds to preset pressure pattern information.

Here, the preset pressure pattern information may be data associated with a pressurization pattern in which the pen tip 201 of the stylus pen 200 is pressurized. The controller 180 of the mobile terminal 100 that has received pressure sensing information from the controller 210 of the stylus pen 200 or the stylus pen 200 can control the operation mode of the stylus pen 200 only when the pen tip 201 is pressurized in a preset manner (for example, a preset number of times, a preset intensity, etc.). In other words, the controller 180 of the mobile terminal 100 that has received pressure sensing information from the controller 210 of the stylus pen 200 or the stylus pen 200 can recognize when a pressure applied to the pen tip 201 corresponds to a preset manner as a user's real intention desired to apply a user input through the stylus pen 200. Accordingly, when the stylus pen 200 is pressurized by a malfunction, the pen 200 can be controlled not to receive a user input.

Further, the stylus pen 200 can be operated in any one of a first operation mode, a second operation mode and a sleep mode, and the sleep mode denotes a state in which a user input is not received. In the sleep mode, at least one of sensors provided in the stylus pen 200 can be deactivated. Meanwhile, even in the sleep mode, the pressure sensor 241 provided in the stylus pen 200 can exist in an active state either continuously or for a preset period of time, and through this, the stylus pen 200 can sense a pressure even in the sleep mode to know the user's intention desired to use the stylus pen 200.

Which one of sensors provided in the stylus pen 200 will be activated may be different according to the operation mode of the stylus pen, and hereinafter, the operation mode of the stylus pen will be described in detail. The operation mode of the stylus pen 200 excluding the sleep mode may be largely controlled in two modes. For a first mode, the operation mode of the stylus pen 200 can be controlled by the controller 210 provided in stylus pen 200.

More specifically, the controller 210 provided in the stylus pen 200 can determine whether the stylus pen 200 is located on the touch screen 151 of the mobile terminal 100 or located out of the touch screen 151 when pressure information is sensed by the pressure sensor. Furthermore, the operation mode of the stylus pen 200 can be determined based on a result of the determination. For example, as a result of the determination, when the stylus pen 200 is located on the touch screen 151, the controller 210 of the stylus pen 200 can drive the pressure sensor 241 in an active state and the optical sensor 203 in an inactive state. In the first operation mode, the stylus pen 200 can enter information through a touch input to the touch screen, and thus the optical sensor 203 maintains an inactive state.

Further, the controller 210 of the stylus pen 200 can determine whether the stylus pen 200 is located on the touch screen 151 or located out of the touch screen 151 through any one of various methods. For example, the controller 210 of the stylus pen 200 can sense an amount of light through the optical sensor 203 in response to the sensing of a pressure applied to the pen tip 201 on the pressure sensor 241 of the stylus pen 200. When the amount of light sensed through the optical sensor 203 is above a preset reference, the controller 210 can determine that the stylus pen 200 is located on the touch screen 151.

This is based on the assumption that the touch screen 151 is in an on state. In other words, when the touch screen 151 is in an on state, the optical sensor 203 of the stylus pen 200 located on the touch screen 151 can sense an amount of light above a preset reference based on the light emitted from the touch screen 151. Thus, when it is determined that the stylus pen 200 is located on the touch screen 151, the controller 210 can drive the optical sensor 203 in an off state to execute a touch input on the touch screen 151 using the pen tip 201 and the pressure sensor 241.

In another example, when the amount of light sensed through the optical sensor 203 is below (or less than) a preset reference, the controller 210 can determine that the stylus pen 200 is located out of the touch screen 151. This is based on the assumption that the touch screen 151 is in an on state. In this instance, the controller 210 drives the optical sensor 203 in an on state, and can sense a user input applied to a region out of the touch screen 151 using the optical sensor 203 and the pressure sensor 241.

In still another example, whether the stylus pen 200 is located on the touch screen 151 or located out of the touch screen 151 can be determined based on the intensity of a wireless signal between the stylus pen 200 and the mobile terminal 100. The controller 210 of the stylus pen 200 can sense the intensity of a wireless signal between the mobile terminal 100 and the stylus pen 200 through the optical sensor 203 in response to the sensing of a pressure applied to the pen tip 201. When the sensed intensity of the wireless signal is above a preset level, the controller 210 of the stylus pen 200 can determine that the stylus pen 200 is on the touch screen 151 to operate the operation mode of the stylus pen 200 in a first operation mode. When the sensed intensity of the wireless signal is below (or less than) a preset level, the controller 210 of the stylus pen 200 can determine that the stylus pen 200 is located out of the touch screen 151 to operate the operation mode of the stylus pen 200 in a second operation mode.

As described above, after the operation mode of the stylus pen 200 is determined by the control of the stylus pen 200, the controller 180 of the mobile terminal 100 can receive information sensed from sensors activated in each operation mode of the stylus pen 200 to perform control corresponding to the received information. The controller 180 can perform different control actions according to information sensed in which mode even if it is the same user input. Various controls on the mobile terminal according to the operation mode will be described in more detail in the following description, and hereinafter, a method of controlling the operation mode of the stylus pen in a mobile terminal will be described.

In the above, a method of controlling the operation mode of the stylus pen 200 on the stylus pen 200 itself has been described. In addition, a mobile terminal according to an embodiment of the present disclosure can control the operation mode of the stylus pen 200 based on pressure sensing information received from the stylus pen 200. The controller 180 of the mobile terminal 100 can determine whether or not a touch due to the stylus pen 200 has been sensed on the touch screen 151, and determine the operation mode of the stylus pen 200 according to a result of the determination. Furthermore, the controller 180 can transmit a control signal corresponding to the determined operation mode to the stylus pen 200. Then, the stylus pen 200 can activate or deactivate a sensor required to operate an operation mode determined by the mobile terminal 100 based on the control signal.

Hereinafter, a method of controlling the operation mode of the stylus pen 200 on a mobile terminal will be described in more detail. First, this description is based on the assumption that the operation mode of the stylus pen 200 is a sleep mode. As illustrated in FIG. 4, the process of sensing a pressure applied to the pen tip 201 on the pressure sensor 241 provided in the stylus pen 200 in a sleep mode is performed (S410).

The controller 210 of the stylus pen 200 transmits pressure sensing information (hereinafter, referred to as first sensing information) sensed on the pressure sensor 241 to the mobile terminal 100 through wireless communication in response to the sensing of a pressure applied to the pen tip 201 from the pressure sensor 241. The process (S420) of determining whether or not a touch event has occurred on the touch screen 151 in response to the reception of the first sensing information is performed on the mobile terminal. The process of determining whether or not the touch event has occurred can additionally perform the process of acquiring touch coordinate information corresponding to the touch event.

Further, the stylus pen 200 can transmit the first sensing information to the mobile terminal only when the first sensing information corresponds to preset pressure pattern information. In another example, the controller 180 of the mobile terminal 100 can determine whether or not the touch event has occurred on the touch screen only when the first sensing information corresponds to preset pressure pattern information.

In other words, the controller 180 of the mobile terminal 100 that has received pressure sensing information from the controller 210 of the stylus pen 200 or the stylus pen 200 can control the operation mode of the stylus pen 200 when the pressure sensing information corresponds to preset pressure pattern information. Here, preset pressure pattern information may be data associated with a pressurization pattern in which the pen tip 201 of the stylus pen 200 is pressurized. The controller 180 of the mobile terminal 100 that has received pressure sensing information from the controller 210 of the stylus pen 200 or the stylus pen 200 can control the operation mode of the stylus pen 200 only when the pen tip 201 is pressurized in a preset manner (for example, a preset number of times, a preset intensity, etc.). In other words, the controller 180 of the mobile terminal 100 that has received pressure sensing information from the controller 210 of the stylus pen 200 or the stylus pen 200 can recognize when a pressure applied to the pen tip 201 corresponds to a preset manner as a user's real intention desired to apply a user input through the stylus pen 200. Accordingly, when the stylus pen 200 is pressurized by a malfunction, the pen 200 can be controlled not to be in a state capable of receiving a user input.

When returning to the process S420, the controller 180 senses whether or not a touch event due to the stylus pen 200 has occurred on the touch screen 151. Here, the touch event is an event associated with whether or not the touch screen 151 is touched by the stylus pen 200 at the time when the first sensing information is sensed on the stylus pen 200, and the touch event may be sensed on a touch sensor (or touch panel) provided in the touch screen 151. In other words, when a object body to which pressurization is applied at the time when pressurization is applied to the pen tip 201 is the touch screen 151, the touch event occurs.

Further, a touch event to the touch screen 151 can be sensed in various manners. For an example, the touch screen 151 can sense a touch input applied to the touch screen 151 by the pen tip 201 of the stylus pen 200 formed as a conductor. Furthermore, the stylus pen 200 can transfer a touch signal to a side of the mobile terminal based on an electric field formed on the stylus pen 200. In this instance, the touch screen 151 or the controller 180 of the mobile terminal can sense such a touch signal to recognize that the stylus pen 200 has applied a touch to the touch screen 151.

The controller 180 can drive an operation mode of the stylus pen according to whether or not the touch event has occurred in either one of a first operation mode in which the stylus pen applies an input to a region within a touch screen region of the touch screen, and a second operation mode in which the stylus pen applies an input to a region out of the touch screen region of the touch screen. The controller 180 can also transmit a control signal for controlling the operation mode of the stylus pen 200 to the stylus pen 200. The stylus pen 200 can be operated in either one operation mode based on such a control signal.

When it is determined that a touch event has occurred during the process S420, namely, when the touch event has occurred as a result of determination in response to the reception of the first information (S430), the controller 180 can drive the stylus pen in the first operation mode. The first operation mode of the stylus pen is a state in which the pressure sensor provided in the stylus pen is activated, and the optical sensor is deactivated. For example, it is assumed that usable sensors for receiving a user input are the pressure sensor 241 and the optical sensor 203.

In the first operation mode in which an input due to the stylus pen 200 is applied to the touch screen 151 of the mobile terminal 100, a direct touch input to the touch screen 151 by the stylus pen 200 can be allowed to activate only the pressure sensor 241 between the pressure sensor 241 and the optical sensor 203. Accordingly, when the optical sensor 203 is in an on state, it is switched to an off state, or when the optical sensor 203 is in an off state, it continuously maintains the off state (S431).

Accordingly, the stylus pen 200 transmits pressure sensing information sensed from the pressure sensor 241 to the mobile terminal 100 (S432). The controller 180 of the mobile terminal can combine a touch input due to the pen tip 201 and pressure sensing information (this pressure sensing information is pressure sensing information received from the stylus pen during the process S432) sensed by the pressure sensor 241 at the time when the touch input due to the pen tip 201 is applied to perform control for the mobile terminal (S433). Here, the controller 180 can sense a touch coordinate touched with the tip portion 201, and perform control linked to information displayed in a region corresponding to the touch coordinate.

Figure 5B:
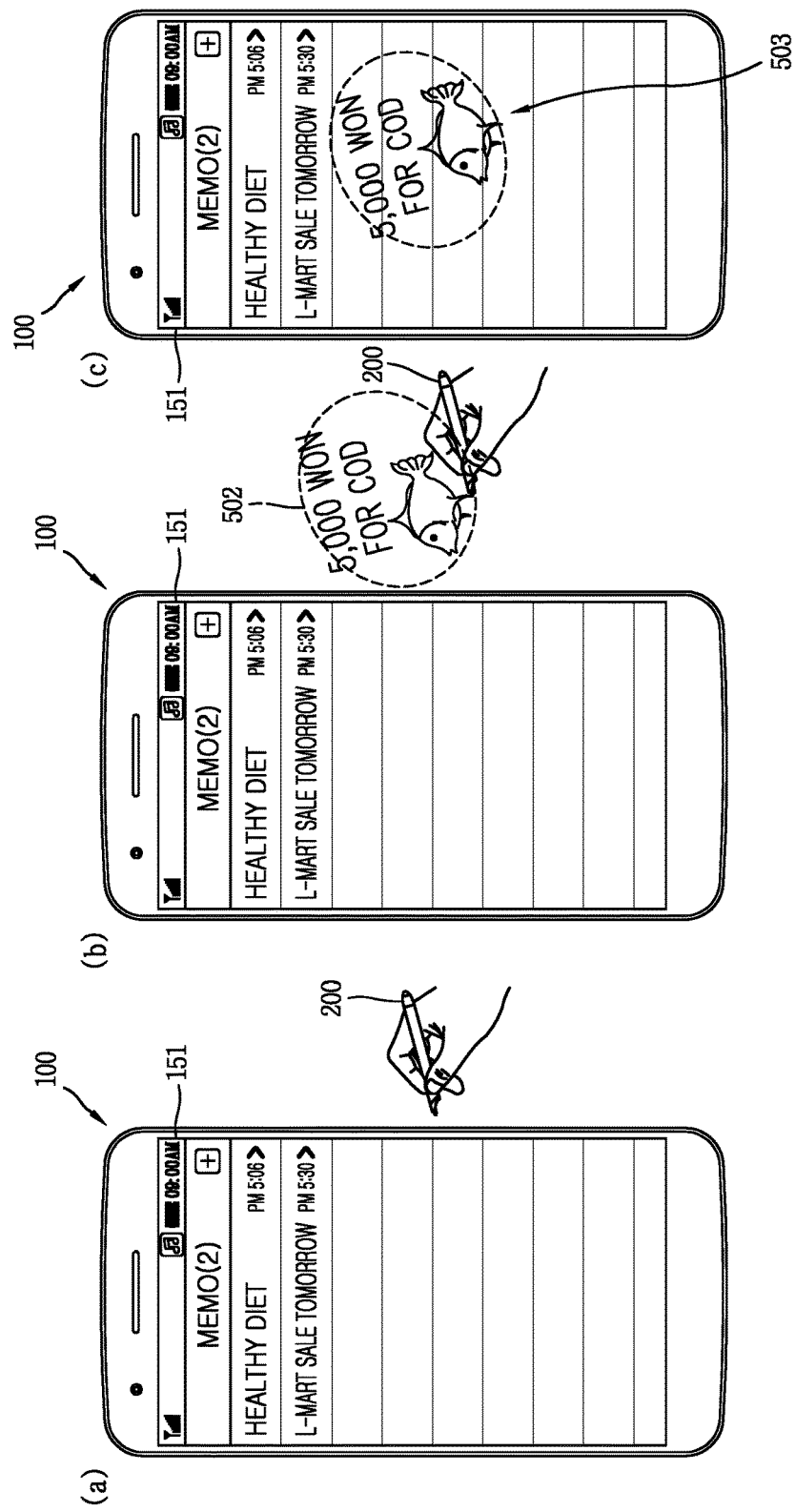

For example, as illustrated in FIG. 5B(a), when first sensing information that is pressure sensing information is generated from the stylus pen 200, and as a result of determination, a touch event does not occur, the controller 180 drives the stylus pen 200 in a second operation mode in which a user input is received through the optical sensor. Thus, in the second operation mode, as illustrated in FIG. 5B(b), the controller 180 can sense a user input 502 in a region out of the touch screen 151 through the optical sensor 203.

The sensed information is transmitted from the stylus pen 200 to the mobile terminal 100. The controller 180 of the mobile terminal 100 can process information received from the optical sensor 203 of the stylus pen 200 as an input to the mobile terminal 100. The information can be processed in connection with an application corresponding to an execution screen currently displayed on the touch screen 151. For example, as illustrated in the drawing, when information 502 is entered by the stylus pen 200 when a memo application is displayed, the entered information can be processed as memo information as illustrated in FIG. 5B(c). Furthermore, the entered information can be processed as an input for selecting a function associated with the memo application or controlling the memo application.

Figure 5C:
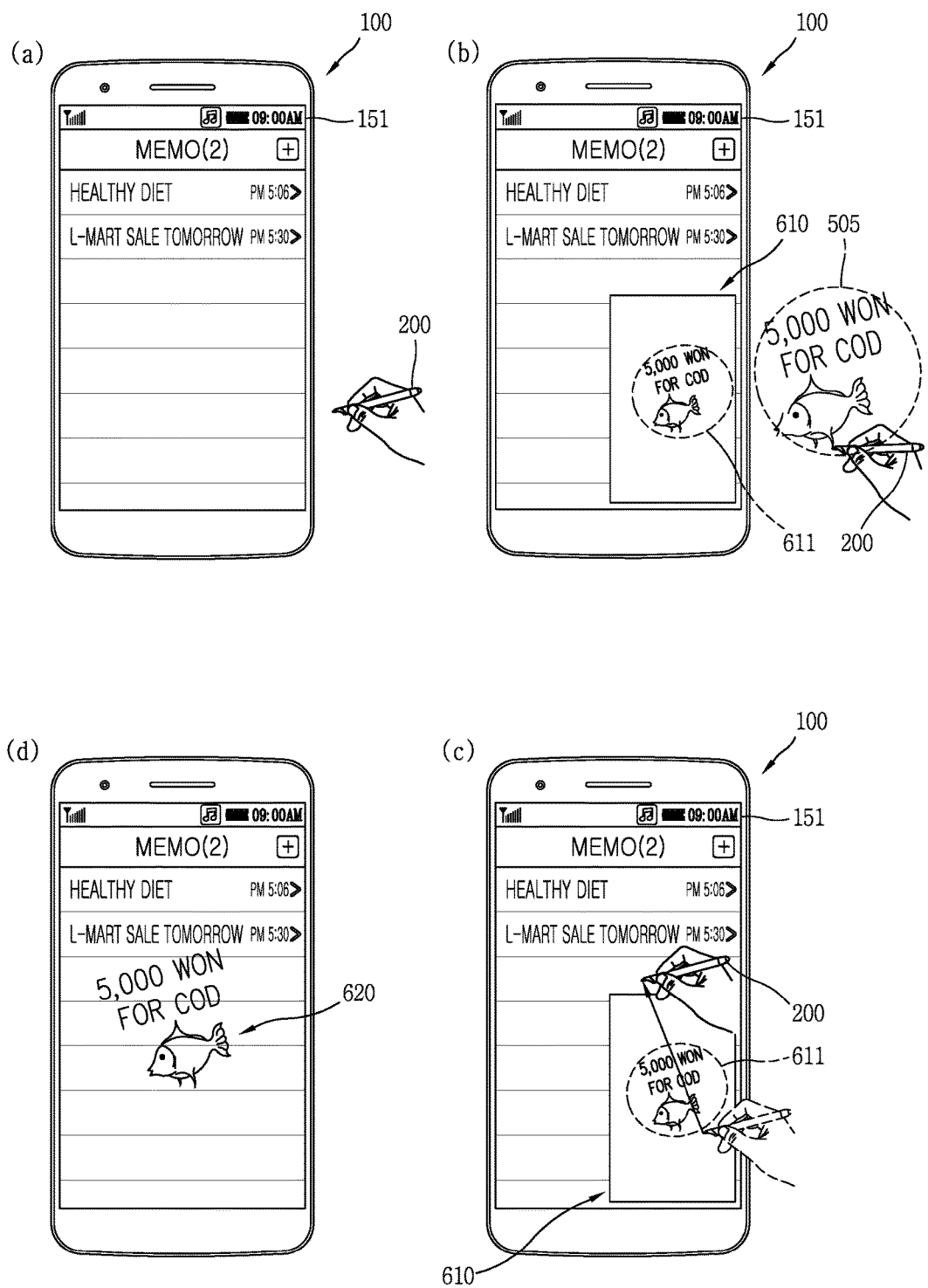

When an input is applied in a region out of the touch screen 151, a user needs to check whether or not information desired to enter through the stylus pen 200 is being accurately entered. Accordingly, when information is entered by the stylus pen 200 in the second operation mode as illustrated in FIGS. 5C(a) and 5C(b), the controller 180 of the mobile terminal to an embodiment of the present disclosure can display information entered out of the touch screen 151 by the stylus pen 200 in at least one region of the touch screen 151. The controller 180 can display information 611 entered out of the touch screen 151 by the stylus pen 200 on a preview window 610. Whether to link a graphic image 611 corresponding to information entered out of the touch screen 151 by the stylus pen 200 to an application corresponding to a currently displayed execution screen or reflect it to an execution screen of a currently displayed application can be determined based on the user's selection. The user's selection may be performed in various manners, and for example, as illustrated in FIGS. 5C(c) and 5C(d), the preview window 610 or the graphic object 611 corresponding to information included in the preview window 610 can be dragged onto an execution screen, and the controller 180 can link information entered by the stylus pen 200, namely, the graphic object 611, to an application corresponding to a currently displayed execution screen or an execution screen of a currently displayed application.

Figure 6:
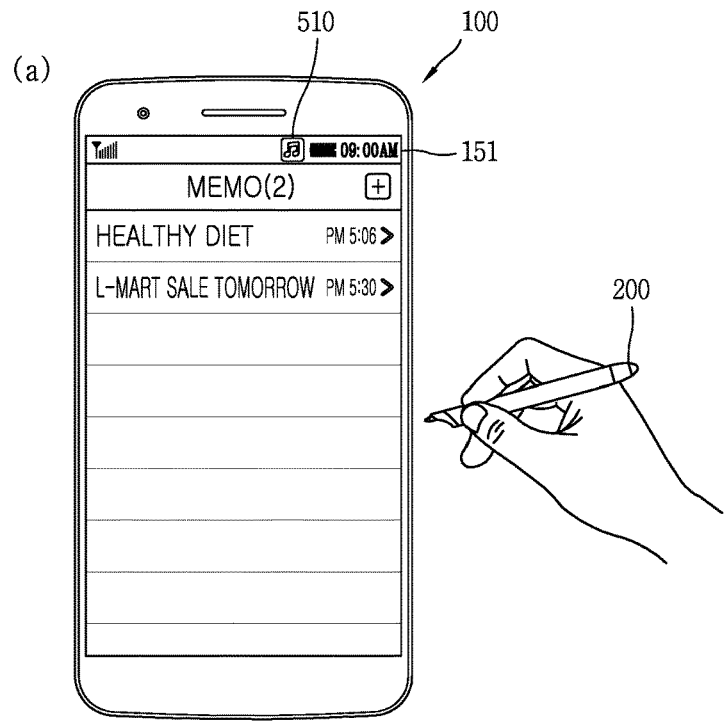
Figure 6:
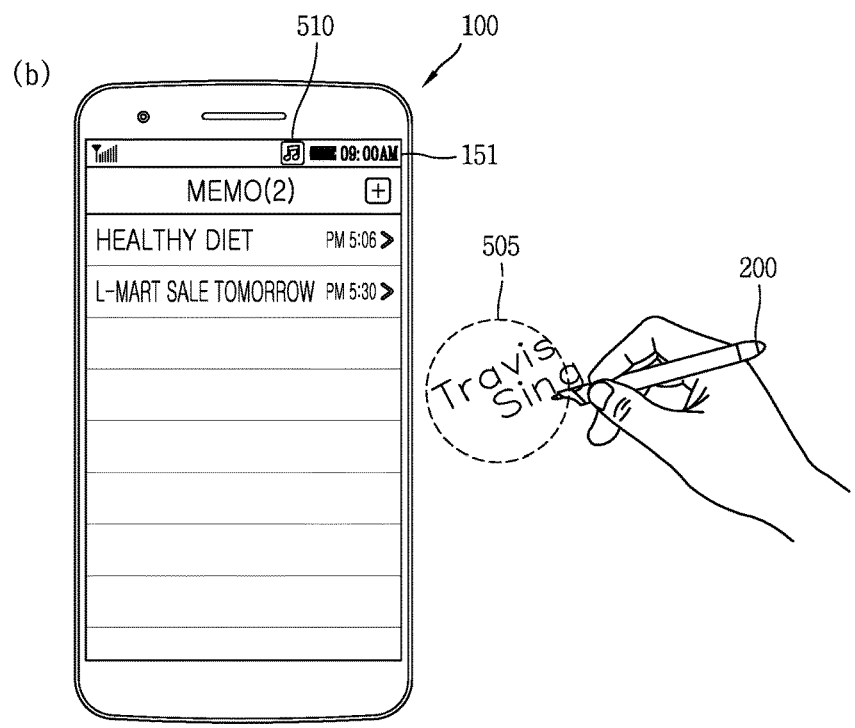

In another example, the controller 180 can use information entered out of the touch screen 151 as a control command for another function or another application other than an application corresponding to an execution screen currently displayed on the touch screen 151. For example, as illustrated in FIG. 6, when information is sensed by the stylus pen 200 in a region out of the touch screen 151 when a music listening function application is driven in the background, the controller 180 can process the sensed information 505 in connection with the application driven on the background. In this instance, the controller 180 can control the music listening function application based on information received from the stylus pen 200. For example, a playback target song can be changed.

When a plurality of applications are driven in the background, which application is to be controlled based on information entered from the stylus pen 200 can be predetermined according to the user's setting or under the control of the controller. In this instance, there may exist priorities among applications, and the controller 180 can control an application having the highest priority based on information entered from the stylus pen 200.

When an input is applied out of the touch screen by the stylus pen 200, the mobile terminal to an embodiment of the present disclosure can display items corresponding to a plurality of control target applications or functions, respectively. Furthermore, the mobile terminal can select any one of the items based on an input applied out of the touch screen by the stylus pen 200.

Figure 7A:
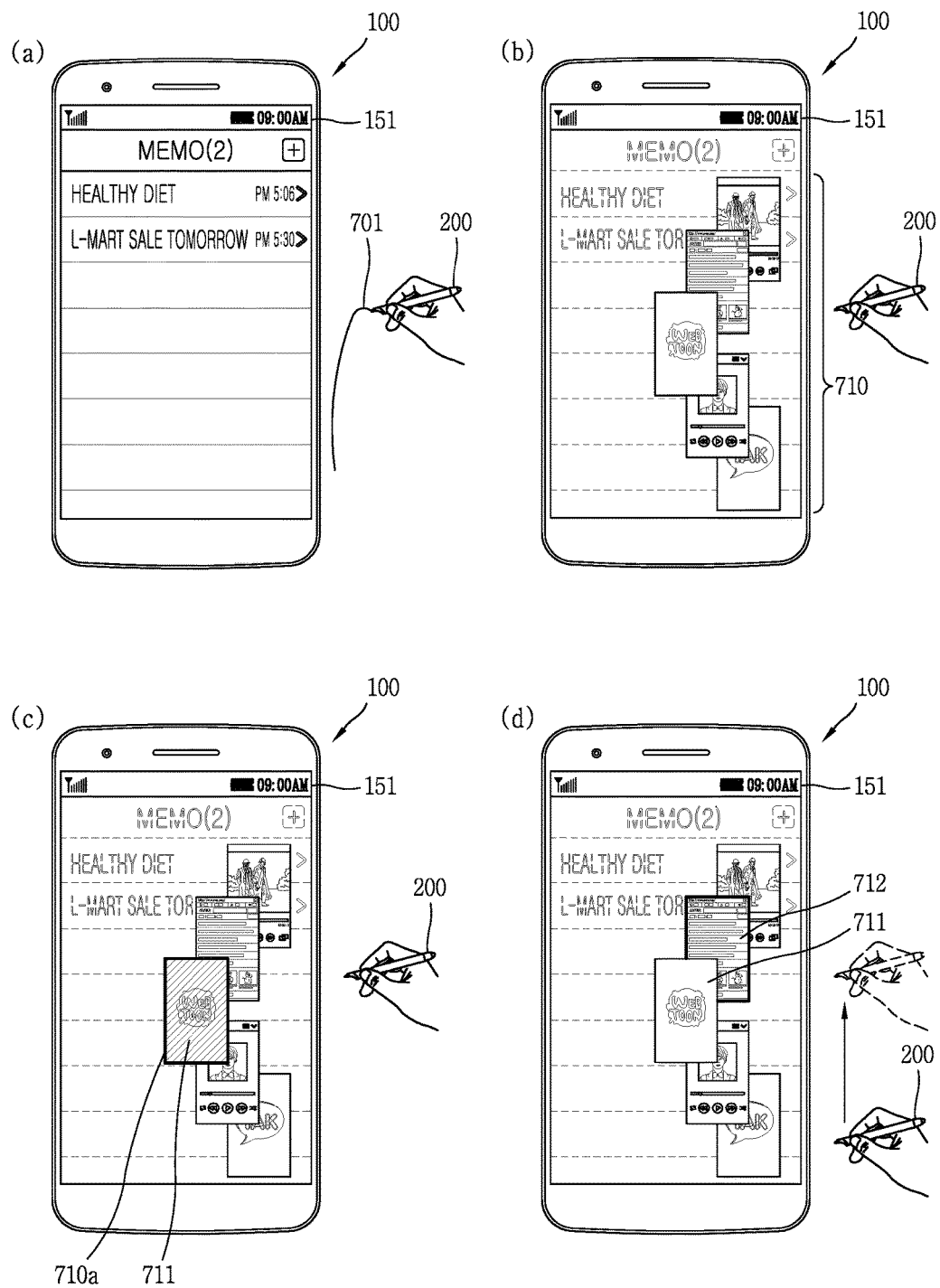

The item can be displayed when information entered out of the touch screen 151 by the stylus pen 200 corresponds to preset pattern information 701 as illustrated in FIG. 7A(a). As described above, when the preset pattern information 701 is entered by the stylus pen 200, the controller 180 can display items 710 corresponding to an application or function subject to control in one region of the touch screen 151 as illustrated in FIG. 7A(b).

Here, an application or function subject to control may be an application or function i) recently performed, ii) currently driven in the background, iii) having a high use frequency or iv) set by a user. Further, the selection of any one of the plurality of displayed items 710 can be performed by an input due to the stylus pen 200 applied out of the touch screen 151 as illustrated in FIGS. 7A(c) and 7A(d). The controller 180 can process a specific item 711 subject to selection in a highlighted manner.

Figure 7B:
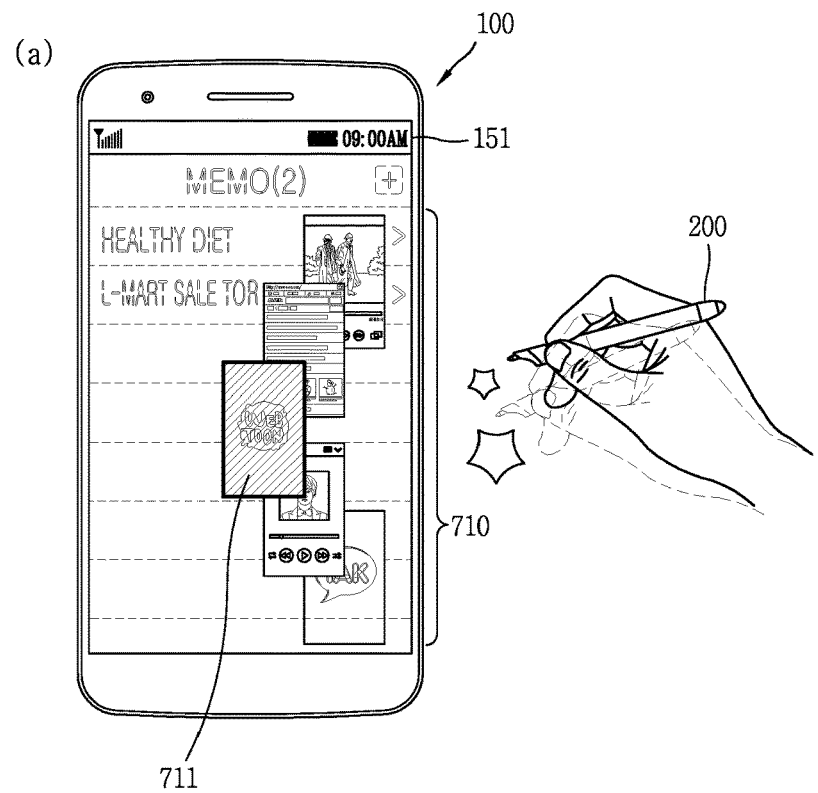
Figure 7B:
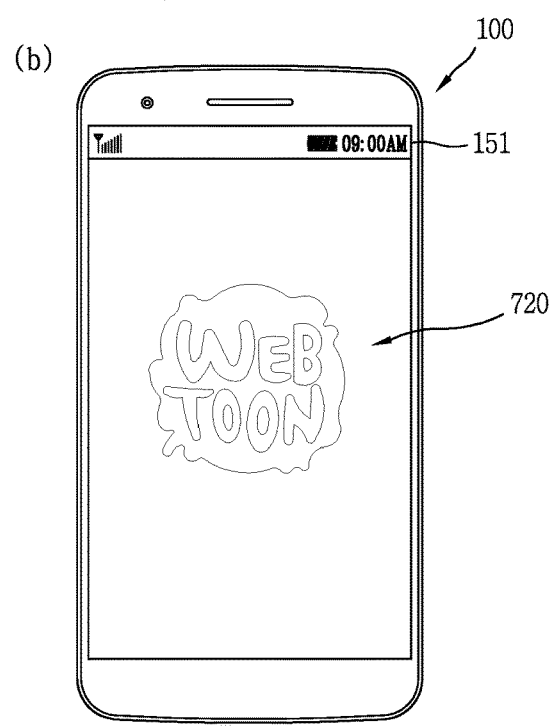

The controller 180 can change a specific item subject to selection (711→712) by a drag gesture or the like of the stylus pen 200 applied out of the touch screen. In this instance, the highlighted item is also changed. Furthermore, the selection of a specific item can be performed based on a specific gesture (for example, defined by an input with a preset number of times, an input with a prespecified trajectory) due to the stylus pen as illustrated in FIG. 7B(a). When a specific item is selected, as illustrated in FIG. 7B(b), the controller 180 can display an execution screen 720 corresponding to the selected item on the touch screen 151. Thus, the controller 180 can perform the switching of a screen displayed on the touch screen 151 using an input applied out of the touch screen.

Further, the controller 180 can process information entered by the stylus pen 200 in a different manner according to pressure information sensed at the time when an input is applied by the stylus pen 200. For example, when the pressure information sensed at the time when an input is applied by the stylus pen 200 corresponds to a first reference pressure, the controller 180 can process an input due to the stylus pen 200 in connection with an application corresponding to an execution screen currently displayed on the touch screen 151.

When pressure information sensed at the time when an input due to the stylus pen 200 is applied corresponds to a second reference pressure different from the first reference pressure, the controller 180 can process an input due the stylus pen 200 in association with a function or application different from or an application corresponding to an execution screen currently displayed on the touch screen 151. For example, the controller 180 can control a different application driven in the background based on an input due to the stylus pen 200.

As described above, when an input corresponding to the second reference pressure is sensed, a mobile terminal according to an embodiment of the present disclosure can a list or icon including items corresponding to different applications or different functions, respectively, that are subject to control, thereby providing a user interface capable of selecting a control object function or application.

In a mobile terminal and a control method thereof in accordance with an embodiment of the present disclosure as described above, when sensed sensing information is received by a pressure sensor in the stylus pen, an input mode of the stylus pen can be determined, and a result of the determination, an operation mode of the stylus pen may be set. The stylus pen can activate a sensor corresponding to a current operation mode among a plurality of sensors provided in the stylus pen based on the set operation mode, thereby applying an input to the mobile terminal regardless of the stylus pen existing in or out of the mobile terminal. Accordingly, a user can apply various inputs to the mobile terminal through the stylus pen regardless of the input region, thereby enhancing user convenience.

When an event for an application different from a specific application occurs when the specific application is being driven, the mobile terminal to an embodiment of the present disclosure can perform control associated with the occurred event by an input due to the stylus pen. Hereinafter, a method of performing control associated with an event using the stylus pen will be described in more detail with reference to the accompanying drawings. In particular, FIGS. 8A and 8B are conceptual views illustrating a method of using a stylus pen.

Figure 8A:
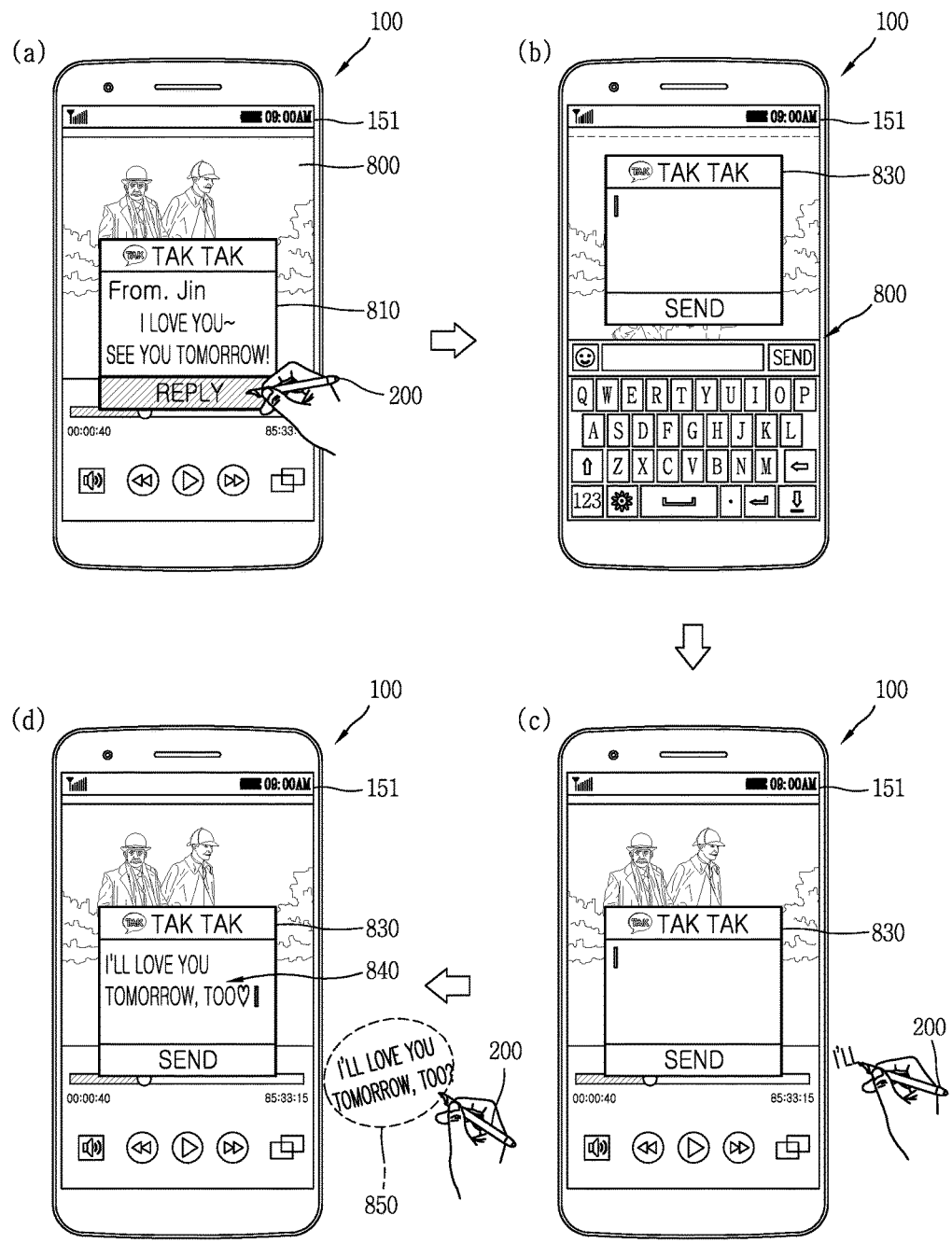
FIGS. 8A and 8B are conceptual views illustrating a method of using a stylus pen.
Figure 8B:
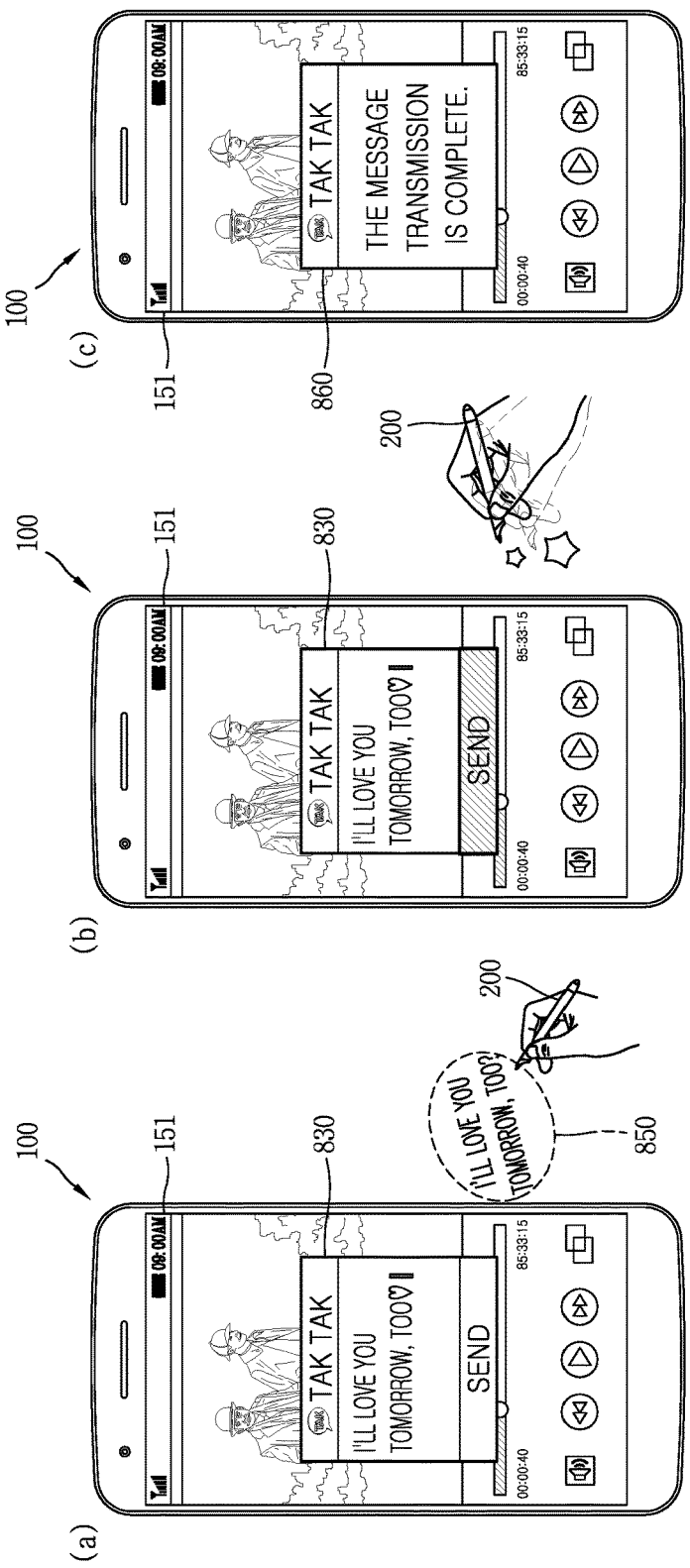

In a mobile terminal according to an embodiment of the present disclosure, when screen information corresponding to a first application is displayed on the touch screen 151 as illustrated in FIG. 8A(a), when an event for a second application different from the first application occurs, screen information 810 associated with the event can be displayed in one region of the touch screen. Here, the event may occur when specific information is received from an application installed in the mobile terminal or a circumstance satisfying a specific condition occurs.

When the screen information 810 is displayed, the event may be also controlled while the first application is being driven based on a touch input applied to the touch screen 151 by a user's hand or a touch input applied by the stylus pen 200. For example, as illustrated in FIGS. 8A(a) and 8A(b), the controller 180 can perform a function (reply transmission function for a message incoming event) associated with an event based on a touch input due to the stylus pen 200 or user's hand to the touch screen.

Here, the first application can be continuously driven or the screen of the first application and the second application can be displayed at the same time. In addition, when a function associated with an event is selected by a user, screen information can be switched to an execution screen of the second application associated with the event.

In a mobile terminal according to an embodiment of the present disclosure, when an input due to the stylus pen 200 is sensed out of the touch screen 151 when the screens of the first application and the second application on which an event has occurred are displayed at the same time, the controller 180 can process an input to the stylus pen 200 as an input associated with the event. For example, as illustrated in FIG. 8A(c), when an input due to the stylus pen 200 is sensed in a region out of the touch screen, the controller 180 can receive data using the stylus pen 200, and recognize the received data as reply information as illustrated in FIG. 8A(d).

The controller 180 can display a visual keyboard 800 for receiving reply information on the touch screen prior to applying an input out of the touch screen 151 through the stylus pen 200. However, as illustrated in FIGS. 8A(c) and 8A(d), when a user input is sensed out of the touch screen 151 through the stylus pen 200, the visual keyboard 800 may be no longer displayed.

As described above, data entered out of the touch screen 151 through the stylus pen 200 can be transmitted to the counterpart terminal as illustrated in FIG. 8B(c) based on a specific gesture (for example, defined by an input with a preset number of times, an input with a prespecified trajectory) sensed by the stylus pen applied out of the touch screen as illustrated in FIGS. 8B(a) and 8B(b).

In addition, reply information entered through the stylus pen 200 can be processed in a different manner based on a pressure sensed at the time when information is entered from the stylus pen 200. For example, when pressure information sensed at the time when an input of reply information is applied by the stylus pen 200 corresponds to a first reference pressure, the controller 180 can process an input due to the stylus pen 200 as a typical information input. When pressure information sensed at the time when an input of reply information is applied by the stylus pen 200 corresponds to a second reference pressure different from the first reference pressure, the controller 180 can additionally perform a preset function (for example, a spell check function, a font change function, and the like) for information entered by the stylus pen 200.

In addition, when screen information corresponding to a first application is displayed, and when a preset input due to the stylus pen is applied to a region out of the touch screen 151 in case where an event for a second application different from the first application occurs, a function associated with the event occurred on the second application can be processed. In other words, the controller 180 can process an input due to the stylus pen in a region out of the touch screen 151 as a control command associated with the occurred event. When an input due to the stylus pen is applied to touch screen 151, the controller 180 can control the first application or control the second application according to whether the input is applied to screen information corresponding to the first application or applied to screen information corresponding to the second application.

When an event occurs on the second application, the controller 180 can display information on the occurred event along with the screen information of the first application for a preset period of time. For example, a popup window 810 according to FIG. 8A(a) can be displayed for a preset period of time and then disappear. Here, the controller 180 can process an input due to the stylus pen applied to a region out of the touch screen while displaying the popup window 810 as a control command for controlling an event that has occurred on the second application.

Figure 9A:
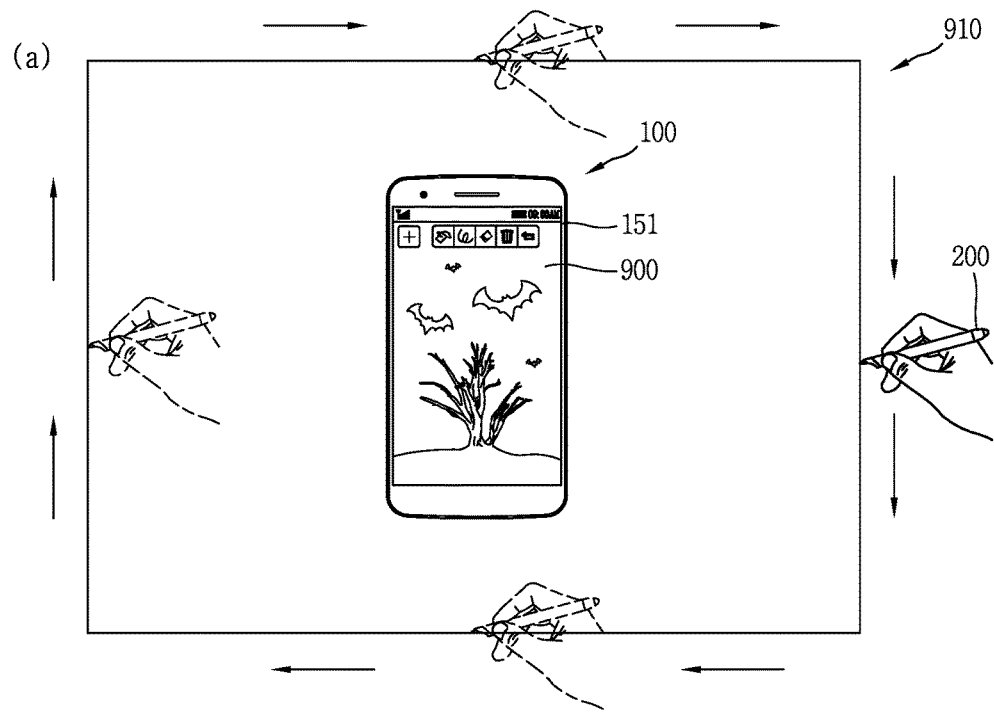
FIGS. 9A, 9B and 9C are conceptual views illustrating a method of extending an input region of an electronic note function using a stylus pen.
Figure 9A:
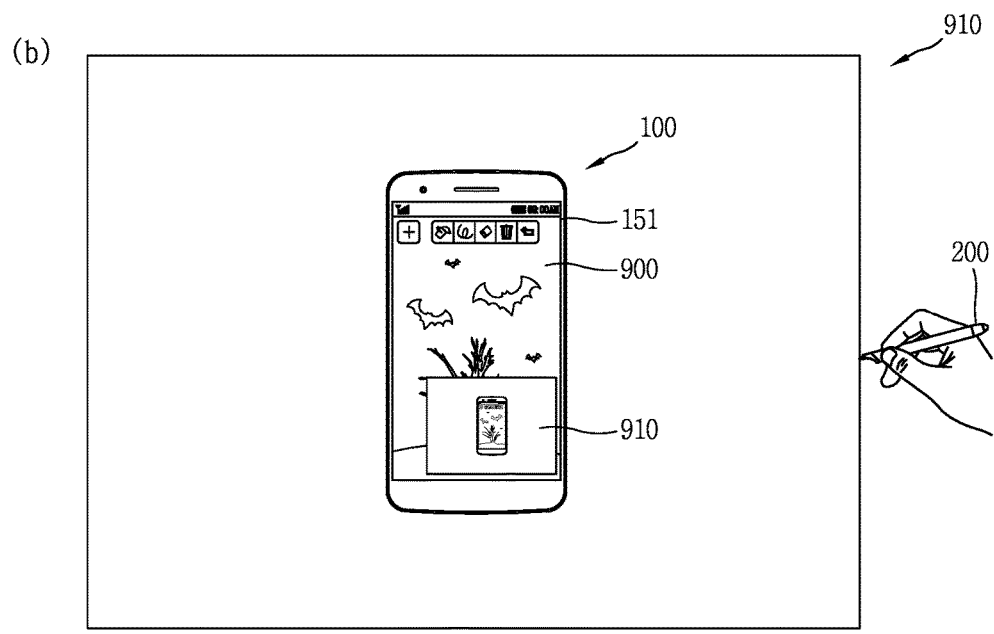
Figure 9B:
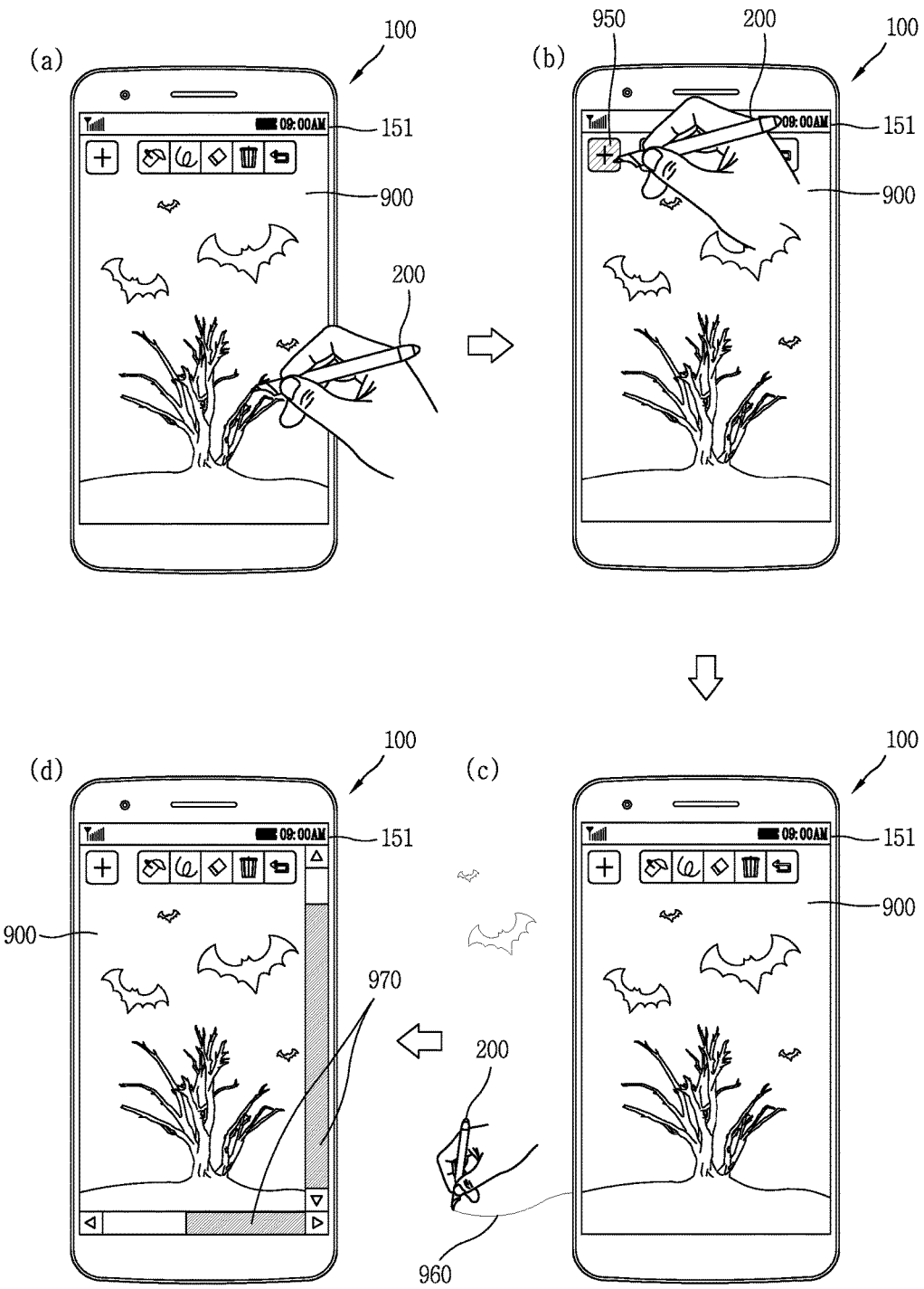
Figure 9C:
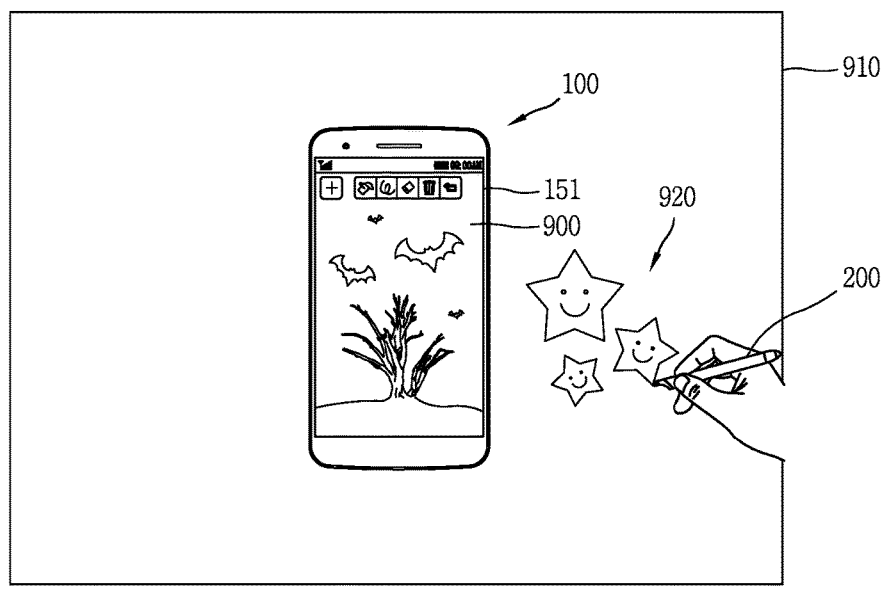
Figure 9C:
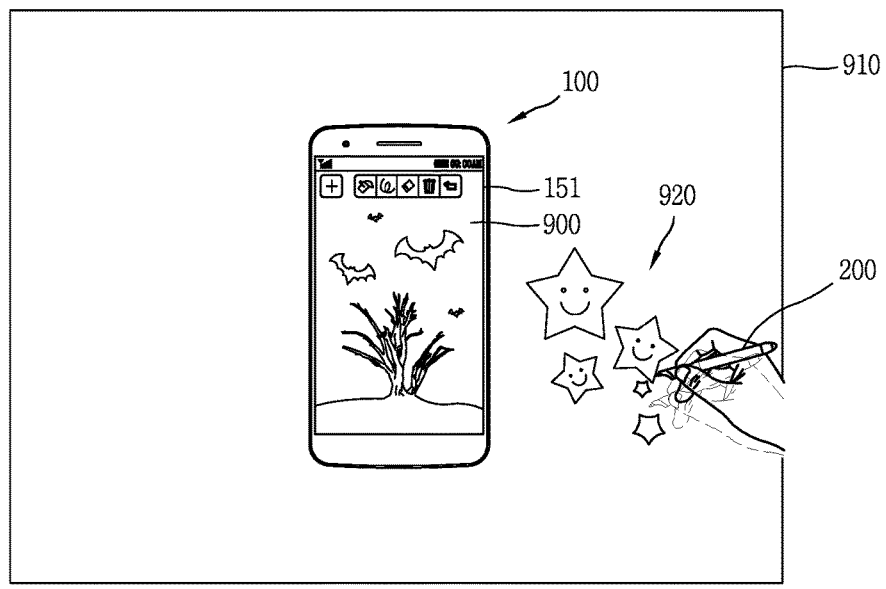

Further, a mobile terminal to an embodiment of the present disclosure can utilize a note region up to an outside of the touch screen region 151 when executing an electronic note function using the characteristic capable of receiving a user input out of the touch screen region 151. In other words, whereas an electronic note region is limited to a touch screen region of the touch screen 151 in the related art, the present disclosure can receive a user input even in a region out of the touch screen region of the touch screen 151, and process it as a note input. FIGS. 9A, 9B and 9C are conceptual views illustrating a method of extending an input region of an electronic note function using the stylus pen 200.

The following description assumes an electronic note function application has been performed. As illustrated in FIG. 9A(a), when a user input is applied to a region out of the touch screen region of the touch screen 151 by the stylus pen 200, the controller 180 can process the user input as note information. Here, the controller 180 can store note information included in an execution screen on the touch screen 151 and note information entered through the stylus pen as one note file.

Up to which region out of the touch screen 151 is a note region can be determined by the user's definition. In a region out of the touch screen 151 as illustrated in FIG. 9A(a), the controller 180 can specify a space corresponding to a gesture of the stylus pen 200 as an electronic note region. The extent of a range of the set region can be displayed through a preview image 910 based on the mobile terminal as illustrated in FIG. 9A(b).

Specifying a note region by the stylus pen 200 can be performed by selecting a specific menu icon 950 (refer to FIG. 9B) on the mobile terminal. In other words, when a user input is applied to an arbitrary space by the stylus pen subsequent to selecting the specific menu icon 950, the controller 180 can set a note region using the user input based on a position at which the mobile terminal 100 is placed. When a preset gesture is sensed by the stylus pen 200, the controller 180 can set an electronic note region based on a position at which the mobile terminal 100 is placed using a user input due to the stylus pen 200 entered subsequent to sensing the preset gesture.

When an electronic note region is set out of the touch screen 151, as illustrated in FIG. 9B(d), a scroll bar 970 for scrolling information displayed on the touch screen 151 can be displayed to display note information entered to the electronic note region out of the touch screen 151. In another example, specifying a note region by the stylus pen 200 can be performed based on an input applied to the stylus pen 200.

For example, when the stylus pen 200 applies an input to a region out of the touch screen 151 above a preset reference pressure, the controller 180 can process the input as an input for specifying a note region. In this instance, the controller can set a trajectory corresponding to the input as a note region. Accordingly, the controller 180 can set a note region using a user input applied above a reference pressure based on a position at which the mobile terminal 100 is placed.

A mobile terminal according to an embodiment of the present disclosure can process information entered by the stylus pen 200 in a region out of the touch screen 151 as note information even when an electronic note region is not previously set. When a user input is applied to a region out of the touch screen region of the touch screen 151 by the stylus pen 200 while the screen information 900 of an electronic note function application is displayed as illustrated in FIG. 9C(a), only when a preset gesture is applied by the stylus pen 200, the controller 180 can process information entered by the stylus pen 200 until prior to applying the preset gesture as note information as illustrated in FIG. 9C(b).

In other words, even though information is entered by the stylus pen 200, when the preset gesture (for example, an input trajectory having a preset pattern, an input with a preset number of times, a preset motion, etc.) is not applied, the controller 180 does not process it as note information. In the mobile terminal 100 according to an embodiment of the present disclosure, when first information is entered to the touch screen region by the stylus pen in a first operation mode of the stylus pen, and the operation mode of the stylus pen is switched from the first operation mode to the second operation mode, second information entered to a region out of the touch screen region by the stylus pen in the second operation mode can be processed in connection with the first information.

In other words, when the stylus pen is out of the touch screen 151 while entering electronic note information on the touch screen in the first operation mode, the operation mode of the stylus pen can be switched from the first operation mode to the second operation mode. Furthermore, information entered in the switched second operation mode can be processed in connection with the first information, thereby storing the first and the second information as one note file. In other words, the continuity of information can be maintained, thereby allowing a user to freely use up to a region out of the touch screen as a note region even though a specific control command is not applied.

The stylus pen 200 can be used in a region out of the touch screen 151 by the mobile terminal according to an embodiment of the present disclosure to enter information on the mobile terminal or enter a control command. Here, the touch screen 151 of the mobile terminal may be in an inactive state. In other words, the controller 180 can control the function of the mobile terminal while maintaining the touch screen 151 in an inactive state using an input of the stylus pen 200 in a region out of the touch screen 151.

The controller 180 can determine an external object to which the stylus pen 200 applies an input using the optical sensor 203 provided in the stylus pen 200 to perform different control according to the type of the external object. In particular, FIGS. 10A and 10B are conceptual views illustrating a method of controlling a function performed on a mobile terminal according to a region to which an input of the stylus pen is applied.

The stylus pen 200 according to an embodiment of the present disclosure can include the optical sensor 203 as described above. When light is reflected from an external object through the optical sensor, the optical sensor can sense the reflected light to receive a user input. The controller 180 can determine from which external object the light is reflected using information sensed from the optical sensor. Moreover, the stylus pen 200 can further include an image sensor, and the controller 180 can determine to which object an input of the stylus pen is applied using information sensed through the image sensor.

Figure 10A:
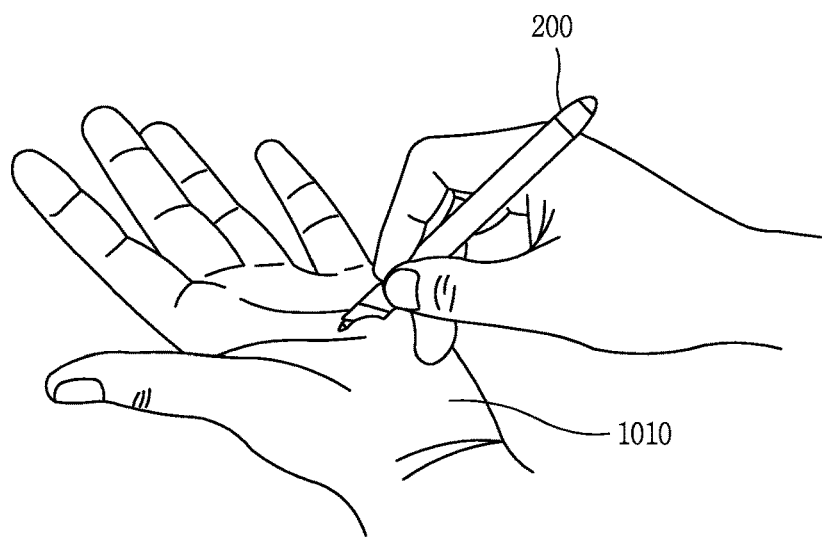
FIGS. 10A and 10B are conceptual views illustrating a method of controlling a function performed on a mobile terminal according to a region to which an input of a stylus pen is applied.
Figure 10A:
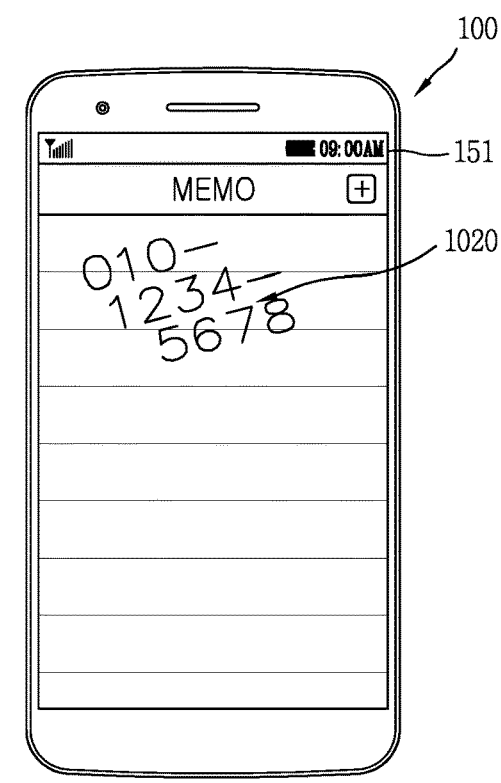
Figure 10B:
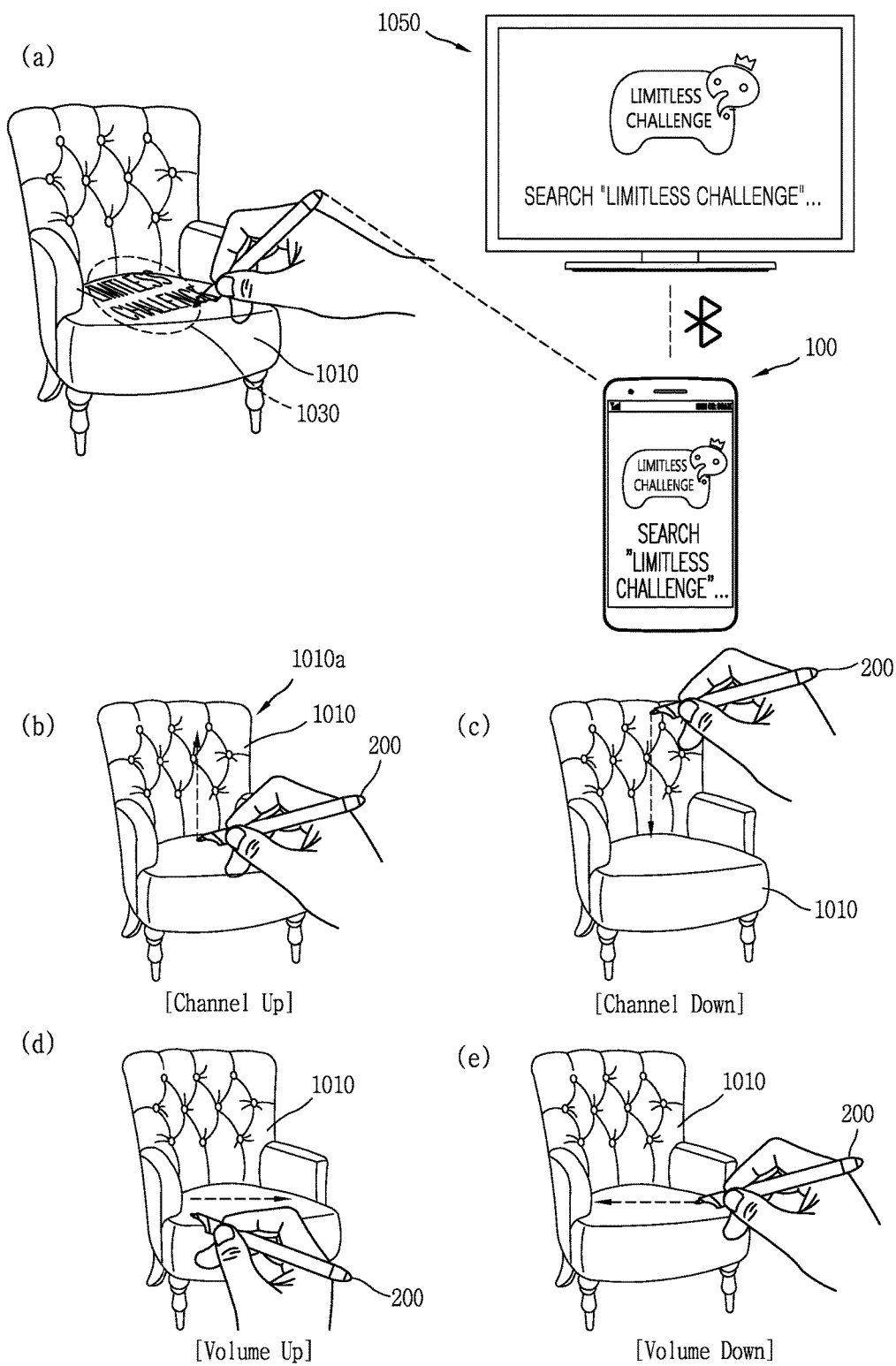

For example, a function of being performed when an input of the stylus pen 200 is applied to a palm 1010 as illustrated in FIG. 10A(a), and a function of being performed when the input is applied to a sofa 1030 as illustrated in FIG. 10B(a) are different from each other. For example, as illustrated in FIG. 10A(a), when an input of the stylus pen 200 is applied to the palm 1010, the controller 180 can process an input applied to the palm by the stylus pen 200 in connection with an electronic note function (or memo function) application as illustrated in FIG. 10A(b). This reflects a user experience in which a user makes a note in a palm. In this instance, the controller 180 can receive an input applied to a palm even though the touch screen 151 is not activated, and display note information 1020 that has been entered to the palm when an electronic note function is activated or the touch screen is activated at another time point after the completion of an input.

When an input is applied to a user's palm by the stylus pen when the touch screen 151 is deactivated, the controller 180 can store information corresponding to the input in the memory 170, and then display the information on the touch screen 151 later. The controller can also allow a user to select whether to continuously store the information or delete the information.

In another example, as illustrated in FIG. 10B(a), when an object to which the stylus pen 200 applies an input is a prespecified object (for example, sofa 1030), a mobile terminal according to an embodiment of the present disclosure can perform a function (or a function matching) in connection with the prespecified object.

For example, in case of the prespecified object (for example, sofa 1030), the controller 180 can control an image device (for example, TV) performing communication with the mobile terminal 100 based on an input of the stylus pen 200 applied to the sofa 1030. As illustrated in FIG. 10B(a), the controller 180 can transmit a control signal to the TV to display a program corresponding to information entered through the optical sensor of the stylus pen 200.

Moreover, the controller 180 can generate different control signals, respectively, for controlling an image device based on different gestures on the stylus pen 200 as illustrated in FIGS. 10B(b) through 10B(e). The gesture of the stylus pen 200 can be recognized through the optical sensor and pressure sensor, and can be also additionally recognized through other sensors (for example, acceleration sensor, gravity sensor, etc.). Which control signal is to be generated according to which gesture of the stylus pen 200 can be matched based on the user's selection.

As described above, a mobile terminal and a stylus pen according to an embodiment of the present disclosure can perform different controls according to which object the stylus pen applies an input. Accordingly, a customized function can be provided according to a user's stylus pen usage habit, thereby further enhancing user convenience.

Figure 11:
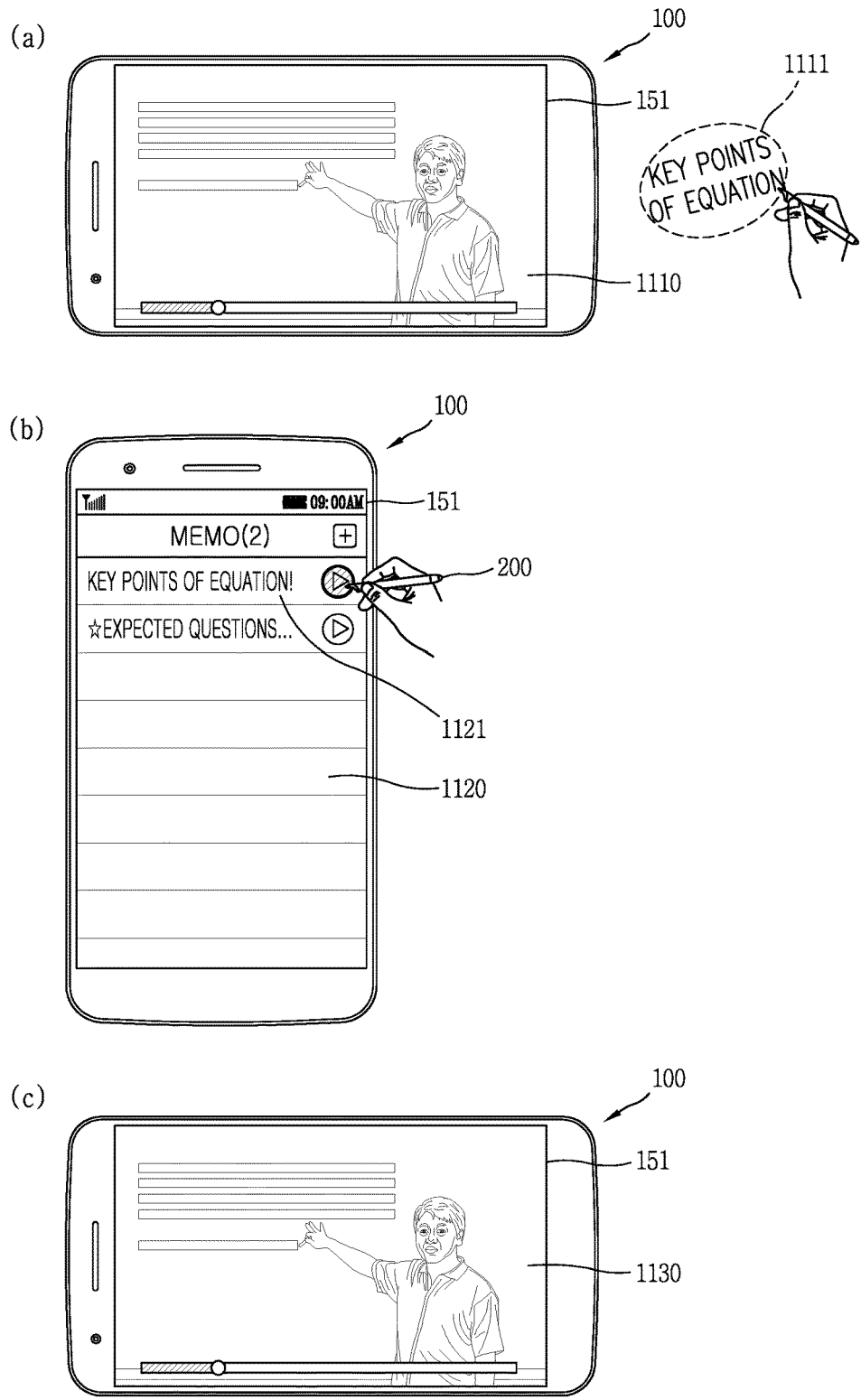
FIGS. 11, 12A and 12B are conceptual views illustrating examples in which a stylus pen according to an embodiment of the present disclosure is used.
Figure 12A:
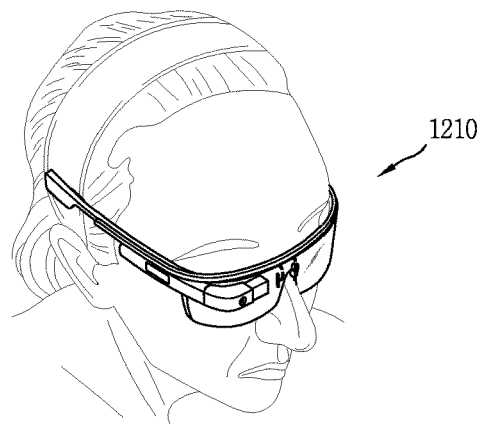
Figure 12A:
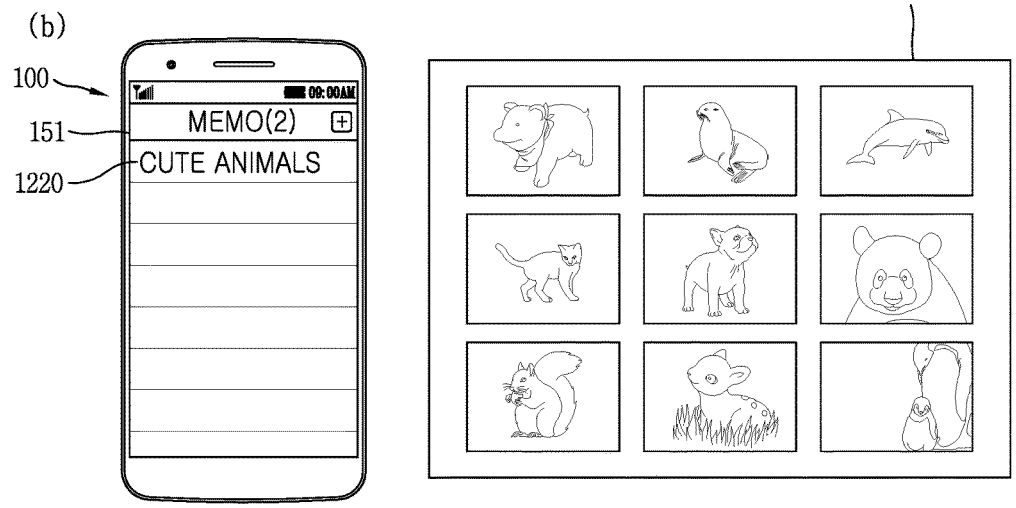
Figure 12A:
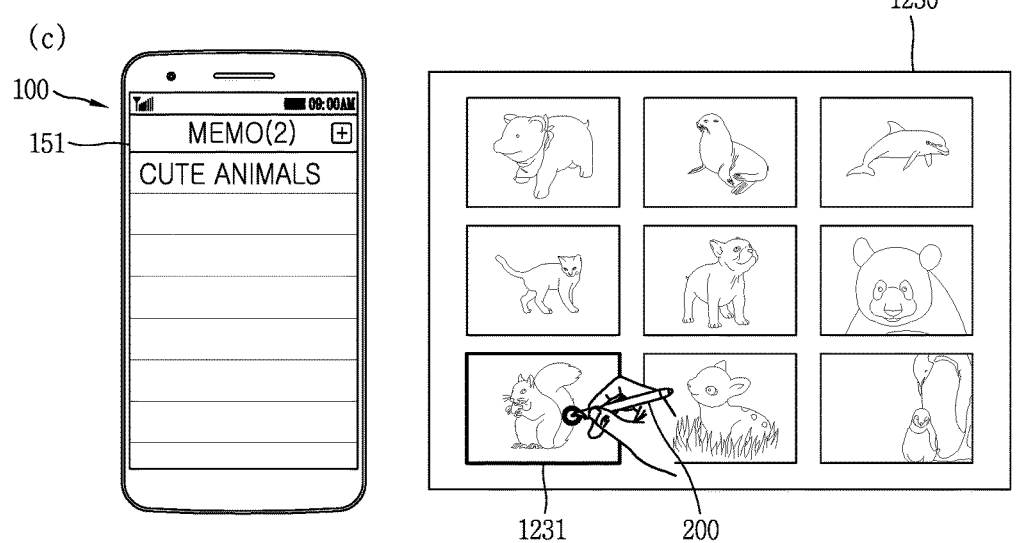
Figure 12B:
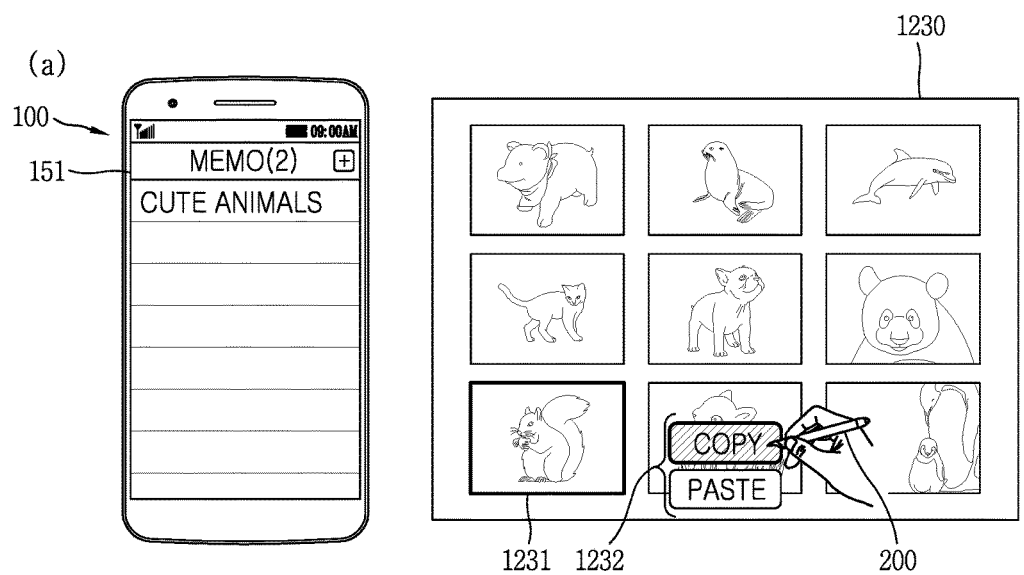
Figure 12B:
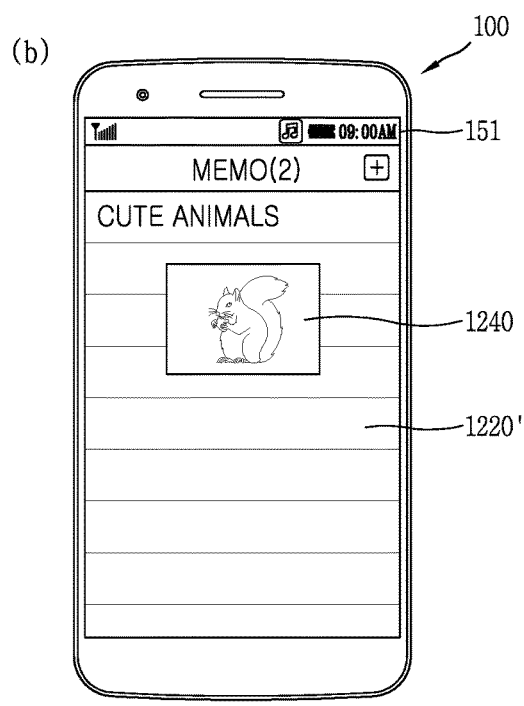

Hereinafter, the examples of using the stylus pen in the second operation mode will be described in more detail. FIGS. 11, 12A and 12B are conceptual views illustrating examples in which the stylus pen according to an embodiment of the present disclosure is used. A mobile terminal according to an embodiment of the present disclosure can process an application corresponding to an execution screen displayed on the touch screen 151 in connection with an input of the stylus pen 200 entered out of the touch screen 151.

For example, as illustrated in FIG. 11(*a*), when information 1111 is entered by the stylus pen 200 when a video application is being performed, the controller 180 can link the entered information 1111 to a video that has been displayed at the time point when the information is entered. As illustrated in FIG. 11(*b*), the information 1111 can be processed as memo information, and a video that has been displayed at the time point when the information 1111 is entered to the information 1111 may be linked to the information 1111. As illustrated in FIGS. 11B and 11C, a memo function application and a video function application may operate in linkage with each other to display the video based on the selection of the video on the application for processing the memo information.

In addition, the controller 180 can receive pressure sensing information sensed when the information 1111 is entered from the stylus pen 200. Furthermore, the controller 180 can determine the importance of the information based on the pressure sensing information.

For example, when pressure information sensed at the time when an input is applied by the stylus pen 200 corresponds to a first reference pressure, the controller 180 can process an input due to the stylus pen 200 as first importance information, and display the information with a color corresponding to the first importance information. When pressure information sensed at the time when an input is applied by the stylus pen 200 corresponds to a second reference pressure different from the first reference pressure, the controller 180 can process an input due to the stylus pen 200 as second importance information different from the first importance information. In addition, a visual attribute (for example, color, text size, text thickness, etc.) of the second importance information may be different from that of the first importance information.

In another example, as illustrated in FIGS. 12A(a) and 12A(b), a mobile terminal according to an embodiment of the present disclosure may be paired with a head mounted display (HMD) 1210 capable of transmitting and receiving data through wireless communication. FIGS. 12A(b) and 12A(c) illustrate the information display region 1230 of the HMD 1210 together. A mobile terminal according to an embodiment of the present disclosure can perform control on information displayed on the HMD 1210 through the stylus pen 200. In other words, when the mobile terminal 100 and HMD 1210 are paired with each other to perform a function in connection with the HMD 1210 and mobile terminal, the controller 180 can process information entered through the stylus pen 200 in the second operation mode of the stylus pen 200 as an input to the HMD 1210.

For example, as illustrated in FIG. 12A(c), specific information among information displayed through the HMD 1210 can be selectable. Furthermore, for an another example, as illustrated in FIG. 12B(a), the selected information 1231 may be additionally controlled through an input through the stylus pen 200. As illustrated in FIGS. 12B(a) and 12B(b), the selected information can be copied based on the user's selection, and the copied information can be transmitted to the mobile terminal 100. In other words, the stylus pen 200 can be used to move information transmitted on the HMD 1210 to the mobile terminal 100. As described above, the stylus pen 200 according to an embodiment of the present disclosure may be processed as an input to another device paired with the mobile terminal 100.

The controller 180 can process an input of the stylus pen 200 as a control command to the mobile terminal 100 or processed as an input to the HMD 1210 according to a pressure applied to the stylus pen 200. In addition, when an event occurs on the mobile terminal, the mobile terminal according to an embodiment of the present disclosure can control the event based on an input to the stylus pen 200.

In other words, even though there is no direct user input to the mobile terminal 100, a user can control the occurred event through the stylus pen 200 from a place apart from the mobile terminal 100. For example, when a call incoming event occurs on the mobile terminal, a function associated with the call incoming event can be performed on the mobile terminal 100 based on an input due to the stylus pen 200 in the second operation mode. When an input corresponding to a first gesture is applied by the stylus pen 200, a call answering function may be performed, and when an input corresponding to a second gesture different from the first gesture is applied, a call rejection function may be performed.

When an input of the stylus pen 200 is applied in the second operation mode when a camera function application is driven on the mobile terminal, the controller 180 can control a camera function based on the input. For example, the controller 180 can adjust camera zoom-in/out or change attribute values such as exposure, contrast and the like based on information entered by the stylus pen 200.

The controller 180 can analyze information entered by the stylus pen 200 to perform control corresponding to the analyzed content. For example, when information corresponding to a text such as "zoom" is entered by the stylus pen 200, the controller 180 can adjust the magnification of the camera. In another example, the controller 180 can control an alarm function based on an input of the stylus pen 200 in the second operation mode when an alarm function application is driven.

For example, when an input corresponding to a first reference pressure is applied by the stylus pen 200 when an alarm is output, the controller 180 can control the alarm function to ring the alarm after a preset period of time. When an input corresponding to a second pressure different from the first reference pressure is applied by the stylus pen 200 when the alarm is output, the controller 180 can suspend the output of the alarm, and end an alarm output function. As described above, a mobile terminal according to an embodiment of the present disclosure can perform various controls on the mobile terminal using the stylus pen, thereby enhancing user convenience.

According to a mobile terminal and a control method thereof in accordance with the present disclosure as described above, when sensed sensing information is received by a pressure sensor in the stylus pen, an input mode of the stylus pen can be determined, and a result of the determination, an operation mode of the stylus pen may be set. The stylus pen may activate a sensor corresponding to a current operation mode among a plurality of sensors provided in the stylus pen based on the set operation mode, thereby applying an input to the mobile terminal regardless of the stylus pen existing in or out of the mobile terminal. Accordingly, a user can apply various inputs to the mobile terminal through the stylus pen regardless of the input region, thereby enhancing user convenience.

According to a mobile terminal and a control method thereof according to an embodiment of the present disclosure, a pressure sensor can be provided in the stylus pen, and a different function is performed according to the information of a pressure sensed from the stylus pen even though it is information having the same input trajectory. Accordingly, a user can adjust a pressure applied to the stylus pen, thereby applying various inputs.

According to a mobile terminal and a control method thereof in accordance with the present disclosure, information displayed on the touch screen and information entered by the stylus pen out of the mobile terminal can be processed as one associated data. Accordingly, a user can use up to a region out of the touch screen as one input region, thereby overcoming a size restriction of the mobile terminal.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a touch screen;
a stylus pen including a pressure sensor and an optical sensor;
a wireless communication unit configured to wirelessly communicate with the stylus pen; and
a controller configured to:
receive sensing information sensed by the pressure sensor from the stylus pen,
determine whether or not the stylus pen is in contact with the touch screen in response to the reception of the sensing information,
drive the stylus pen in a first operation mode in which the pressure sensor provided in the stylus pen is activated and the optical sensor is deactivated, when the sensing information sensed by the pressure sensor indicates the stylus pen is in contact with the touch screen, and
drive the stylus pen in a second operation mode in which both the pressure sensor and the optical sensor provided in the stylus pen are activated, when the sensing information sensed by the pressure sensor indicates the stylus pen is not in contact with the touch screen, wherein the first operation mode is a mode in which the stylus pen applies an input to a region within a touch screen region of the touch screen, and
wherein the second operation mode is a mode in which the stylus pen applies an input to a region out of the touch screen region of the touch screen.

2. The mobile terminal of claim 1, wherein the controller is further configured to:
switch the first operation mode to the second operation mode when the sensing information indicates the stylus pen is no longer in contact with the touch screen for a preset period of time, and
switch the second operation mode to the first operation mode when the sensing information indicates the stylus pen is in contact with the touch screen.

3. The mobile terminal of claim 2, wherein the controller is further configured to:
store first data entered to the touch screen by the stylus pen in the first operation mode, and
when the operation mode of the stylus pen is switched from the first operation mode to the second operation mode, store second data entered to a region out of the touch screen by the stylus pen in connection with the first data.

4. The mobile terminal of claim 3, wherein the controller is further configured to:
store the first data and the second data as one note file when the first data and the second data are entered while an execution screen of a note function application is displayed on the touch screen.

5. The mobile terminal of claim 4, wherein the controller is further configured to:
display information on the touch screen corresponding to the second data entered to the region out of the touch screen region by the stylus pen in the second operation mode.

6. The mobile terminal of claim 5, wherein the controller is further configured to:
display note information corresponding to the first data and the second data on the touch screen.

7. The mobile terminal of claim 3, wherein the second data entered by the stylus pen in the second operation mode corresponds to information sensed by at least one of the pressure sensor and the optical sensor provided in the stylus pen.

8. The mobile terminal of claim 1, wherein the controller is further configured to:
display screen information corresponding to a first function on the touch screen,
process a first input applied by the stylus pen in contact with the touch screen including the screen information as a control command associated with the first function, and
process a second input applied by the stylus pen not in contact with the touch screen including the screen information as a control command associated with a second function different from the first function.

9. The mobile terminal of claim 1, wherein the controller is further configured to:
display screen information corresponding to a first application on the touch screen,
when an event for a second application different from the first application has occurred on the mobile terminal, display screen information associated with the event in one region of the touch screen, and process a function associated with the event in response to a preset input of the stylus pen to a region out of the touch screen region.

10. The mobile terminal of claim 9, wherein the screen information associated with the event is displayed on the touch screen for a preset period of time, and
wherein the controller is further configured to recognize the preset input as a control command for processing a function associated with the event.

11. The mobile terminal of claim 1, wherein the controller is further configured to:
determine the stylus pen is in contact with the touch screen when the sensing information corresponds to preset pressure pattern information.

12. The mobile terminal of claim 11, wherein the controller is further configured to:
determine the stylus pen is in contact with the touch screen when the stylus pen applies a pressure corresponding to the preset pressure pattern to the touch screen.

13. The mobile terminal of claim 1, wherein the controller is further configured to:
deactivate the touch screen,
activate the touch screen in response to the reception of the sensing information, and
drive the stylus pen in either one of the first and the second operation mode based on the received first sensing information.

14. A method of controlling a mobile terminal including a touch screen and a stylus pen including a pressure sensor and an optical sensor, the method comprising:
wirelessly communicating, via a wireless communication unit of the mobile terminal, with the stylus pen;
receiving sensing information sensed by the pressure sensor from the stylus pen;
determining whether or not the stylus pen is in contact with the touch screen in response to the reception of the sensing information;
driving, via a controller of the mobile terminal, the stylus pen in a first operation mode in which the pressure sensor provided in the stylus pen is activated and the optical sensor is deactivated, when the sensing information sensed by the pressure sensor indicates the stylus pen is in contact with the touch screen; and
driving, via the controller, the stylus pen in a second operation mode in which both the pressure sensor and the optical sensor provided in the stylus pen are activated, when the sensing information sensed by the pressure sensor indicates the stylus pen is not in contact with the touch screen,
wherein the first operation mode is a mode in which the stylus pen applies an input to a region within a touch screen region of the touch screen, and
wherein the second operation mode is a mode in which the stylus pen applies an input to a region out of the touch screen region of the touch screen.

15. The method of claim 14, further comprising:
switching the first operation mode to the second operation mode when the sensing information indicates the stylus pen is no longer in contact with the touch screen for a preset period of time; and
switching the second operation mode to the first operation mode when the sensing information indicates the stylus pen is in contact with the touch screen.

16. The method of claim 15, further comprising:
storing first data entered to the touch screen by the stylus pen in the first operation mode; and
when the operation mode of the stylus pen is switched from the first operation mode to the second operation mode, storing second data entered to a region out of the touch screen by the stylus pen in connection with the first data.

17. The method of claim 16, further comprising:
storing the first data and the second data as one note file when the first data and the second data are entered while an execution screen of a note function application is displayed on the touch screen.

18. The method of claim 17, further comprising:
displaying information on the touch screen corresponding to the second data entered to the region out of the touch screen region by the stylus pen in the second operation mode.

19. The method of claim 18, further comprising:
displaying note information corresponding to the first data and the second data on the touch screen.

20. The method of claim 16, wherein the second data entered by the stylus pen in the second operation mode corresponds to information sensed by at least one of the pressure sensor and the optical sensor provided in the stylus pen.

* * * * *